(12) United States Patent
Kasahara

(10) Patent No.: US 11,595,535 B2
(45) Date of Patent: Feb. 28, 2023

(54) INFORMATION PROCESSING APPARATUS THAT COOPERATES WITH SMART SPEAKER, INFORMATION PROCESSING SYSTEM, CONTROL METHODS, AND STORAGE MEDIA

(71) Applicant: CANON KABUSHIKI KAISHA, Tokyo (JP)

(72) Inventor: Ryosuke Kasahara, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 56 days.

(21) Appl. No.: 17/344,022

(22) Filed: Jun. 10, 2021

(65) Prior Publication Data
US 2021/0398530 A1  Dec. 23, 2021

(30) Foreign Application Priority Data
Jun. 19, 2020 (JP) .............................. JP2020-106388

(51) Int. Cl.
*H04N 1/00* (2006.01)
*G06F 3/16* (2006.01)

(52) U.S. Cl.
CPC ......... *H04N 1/00403* (2013.01); *G06F 3/165* (2013.01); *G06F 3/167* (2013.01); *H04N 1/00214* (2013.01)

(58) Field of Classification Search
None
See application file for complete search history.

(56) References Cited

U.S. PATENT DOCUMENTS

| | | | |
|---|---|---|---|
| 10,567,602 B2 | 2/2020 | Maeda | |
| 2008/0207231 A1* | 8/2008 | Kunii | H04M 1/72502 704/E15.001 |
| 2019/0018624 A1* | 1/2019 | Naruse | G06F 3/1294 |
| 2020/0404110 A1* | 12/2020 | Fujisawa | G06F 3/1204 |

FOREIGN PATENT DOCUMENTS

JP    2019018394 A    2/2019

* cited by examiner

*Primary Examiner* — Lennin R Rodriguezgonzalez
(74) *Attorney, Agent, or Firm* — Rossi, Kimms & McDowell LLP

(57) ABSTRACT

An information processing apparatus that is capable of reducing time and effort to set settings of a smart speaker that cooperates with the information processing apparatus when a user starts to use the smart speaker. The information processing apparatus acquires identification information of the user, and acquires audio control information associated with the acquired identification information. Then, the information processing apparatus requests the smart speaker to change the audio setting of the smart speaker based on the acquired audio control information.

9 Claims, 24 Drawing Sheets

*FIG. 20*

| ID | USER NAME | USED LANGUAGE | AVAILABLE FUNCTION RESTRICTION |
|---|---|---|---|
| 1 | AAAaaa | En | FAX/COPY/PRINT/SCAN |
| 2 | BBBbbb | Ja | COPY/PRINT/SCAN |
| 3 | CCCccc | En | COPY/PRINT/SCAN |
| ... | ... | ... | ... |
| ... | ... | ... | ... |

COUNTRY SETTING TABLE — 2101

| COUNTRY SETTING TABLE |
|---|
| United States |
| Australia |
| Germany |
| Canada |
| Great Britain |
| India |
| Spain |
| France |
| Italy |
| Japan |
| Brazil |

*FIG. 21B*

| LOCALE CODE TABLE | | — 2102 |
|---|---|---|
| De-DE | German (Germany) | |
| En-Au | English (Australia) | |
| En-CA | English (Canada) | |
| En-GB | English (Great Britain) | |
| En-IN | English (India) | |
| En-US | English (United States) | |
| En-ES | English (Spain) | |
| Es-Es | Spanish (Spain) | |
| Es-MX | Spanish (Mexico) | |
| Es-US | Spanish (United States) | |
| Fr-CA | French (Canada) | |
| Fr-FR | French (France) | |
| Hi-IN | Hindi (India) | |
| It-IT | Italian (Italy) | |
| Ja-JP | Japanese (Japan) | |
| Pt-BR | Portuguese (Brazil) | |

*FIG. 21C*

| LOCALE CODE LOOKUP TABLE | | — 2103 |
|---|---|---|
| INPUT VALUE | OUTPUT VALUE | |
| De | De-DE | |
| En | En-US | |
| Es | Es-ES | |
| Fr | Fr-FR | |
| It | It-IT | |
| Ja | Ja-JP | |
| Pt | Pt-BR | |

| AUDIO VOLUME SETTING TABLE | |
|---|---|
| NOTIFICATION SOUND | 1 |
| INPUT SOUND | 1 |
| WARNING SOUND | 2 |
| TRANSMISSION TERMINATION SOUND | 0 |
| RECEPTION TERMINATION SOUND | 2 |
| PRINT TERMINATION SOUND | 1 |
| READ TERMINATION SOUND | 0 |

| AUDIO VOLUME SETTING LOOKUP TABLE | |
|---|---|
| INPUT VALUE | OUTPUT VALUE |
| 0 | 0 |
| 1 | 1 |
| 2 | 1 |
| 3 | 2 |
| 4 | 2 |
| 5 | 3 |
| 6 | 3 |
| 7 | 4 |
| 8 | 4 |
| 9 | 4 |
| 10 | 5 |
| 11 | 5 |
| 12 | 5 |
| 13 | 6 |
| 14 | 6 |
| 15 | 7 |
| 16 | 7 |
| 17 | 8 |
| 18 | 8 |
| 19 | 9 |
| 20 | 9 |
| 21 | 10 |

*FIG. 22*

```
{
    "language": "English"
    "command":[
        {
            "operation":"setLocaleInfo"
        },
        {
            "parameter":[
                "LoginFLG:ON",
                "locale":"En-US",
                "function":"copy,scan,print",
                "volume":"2",
            ],
        }
    ]
}
```

FIG. 23

```
{
    "language": "English"
    "command":[
        {
            "operation":"setLocaleInfoDev"
        },
        {
            "parameter":[
                "locale":"En-US",
                "volume":"2",
            ],
        }
    ]
}
```

INFORMATION PROCESSING APPARATUS THAT COOPERATES WITH SMART SPEAKER, INFORMATION PROCESSING SYSTEM, CONTROL METHODS, AND STORAGE MEDIA

BACKGROUND OF THE INVENTION

Field of the Invention

The present invention relates to an information processing apparatus, an information processing system, a control method, and a storage medium, and more particularly to an information processing apparatus that cooperates with a smart speaker operable by voice, an information processing system that includes the information processing apparatus and the smart speaker, control methods, and storage media.

Description of the Related Art

Office equipment, such as a printer, which cooperates with a smart speaker, has come, into wide spread use (see e.g. Japanese Laid-Open Patent Publication (Kokai) No. 2019-18394).

To comfortably use such a smart speaker, it is desirable to properly adjust settings of the smart speaker. On the other hand, the office equipment that cooperates with the smart speaker is used by various users in a case where the office equipment is placed in an office. Therefore, a comfortable operating environment of the smart speaker is different depending on each user using cooperation functions. For example, a language uttered by a user to the smart speaker and a language to be used by the smart speaker when the smart speaker gives utterance to the user are different depending on each use. For this reason, it is desirable to properly configure the settings of the smart speaker on a user basis who uses the smart speaker.

However, it is troublesome to change the settings of the smart speaker by user instructions whenever different users start to use the smart speaker.

SUMMARY OF THE INVENTION

The present invention provides an information processing apparatus that is capable of reducing time and effort to set settings of a smart speaker when a user starts to use the smart speaker, an information processing system, control methods, and storage media.

In a first aspect of the present invention, there is provided an information processing apparatus that cooperates with a smart speaker, including a first acquisition unit configured to acquire identification information of a user, a second acquisition unit configured to acquire audio control information associated with the acquired identification information, and a request unit configured to request the smart speaker to change an audio setting of the smart speaker based on the acquired audio control information.

In a second aspect of the present invention, there is provided an is processing system, in which an information processing apparatus, a smart speaker, and a server that manages settings of the smart speaker cooperate with each other, wherein the information processing apparatus includes a first acquisition unit configured to acquire identification information of a user, a second acquisition unit configured to acquire audio control information associated with the acquired identification information, and a first request unit configured to request the server to change an audio setting of the smart speaker based on the acquired audio control information, wherein the server includes a second request unit configured to request the smart speaker to change the audio setting based on the request by the first request unit, and wherein the smart speaker includes a change unit configured to change the audio setting of the smart speaker based on the request by the second request unit.

In a third aspect of the present invention, there is provided a method of controlling an information processing apparatus that cooperates with a smart speaker, including acquiring identification information of a user, acquiring audio control information associated with the acquired identification information, and requesting the smart speaker to change an audio setting of the smart speaker based on the acquired audio control information.

In a fourth aspect of the present invention, there is provided a method of controlling an information processing system, in which an information processing apparatus, a smart speaker, and a server that manages settings of the smart speaker cooperate with each other, including causing the information processing apparatus to perform acquiring identification information of a user, acquiring audio control information associated with the acquired identification information, and requesting the server to change an audio setting of the smart speaker based on the acquired audio control information, causing the server to perform requesting the smart speaker to change the audio setting based on the request to the server, and causing the smart speaker to perform changing the audio setting of the smart speaker based on the request to the smart speaker.

Further features of the present invention will become apparent from the following description of exemplary embodiments (with reference to the attached drawings).

BRIEF DESCRIPTION OF THE DRAWINGS

FIG. 20 is a diagram showing a logged-in user information table stored in the MFP.

FIGS. 21A to 21E are diagrams of a country setting table, a locale code table, a locale code lookup table, an audio volume setting table, and an audio volume setting lookup table, respectively, which are stored in the MFP.

FIG. 22 is a diagram showing an example of audio control information which is transmitted from the MFP to the cloud server.

FIG. 23 is a diagram showing an example of audio device control information which is transmitted from the cloud server to the smart speaker.

DESCRIPTION OF THE EMBODIMENTS

The present invention will Dow be described in detail below with reference to the accompanying drawings showing embodiments thereof.

Figure 1:
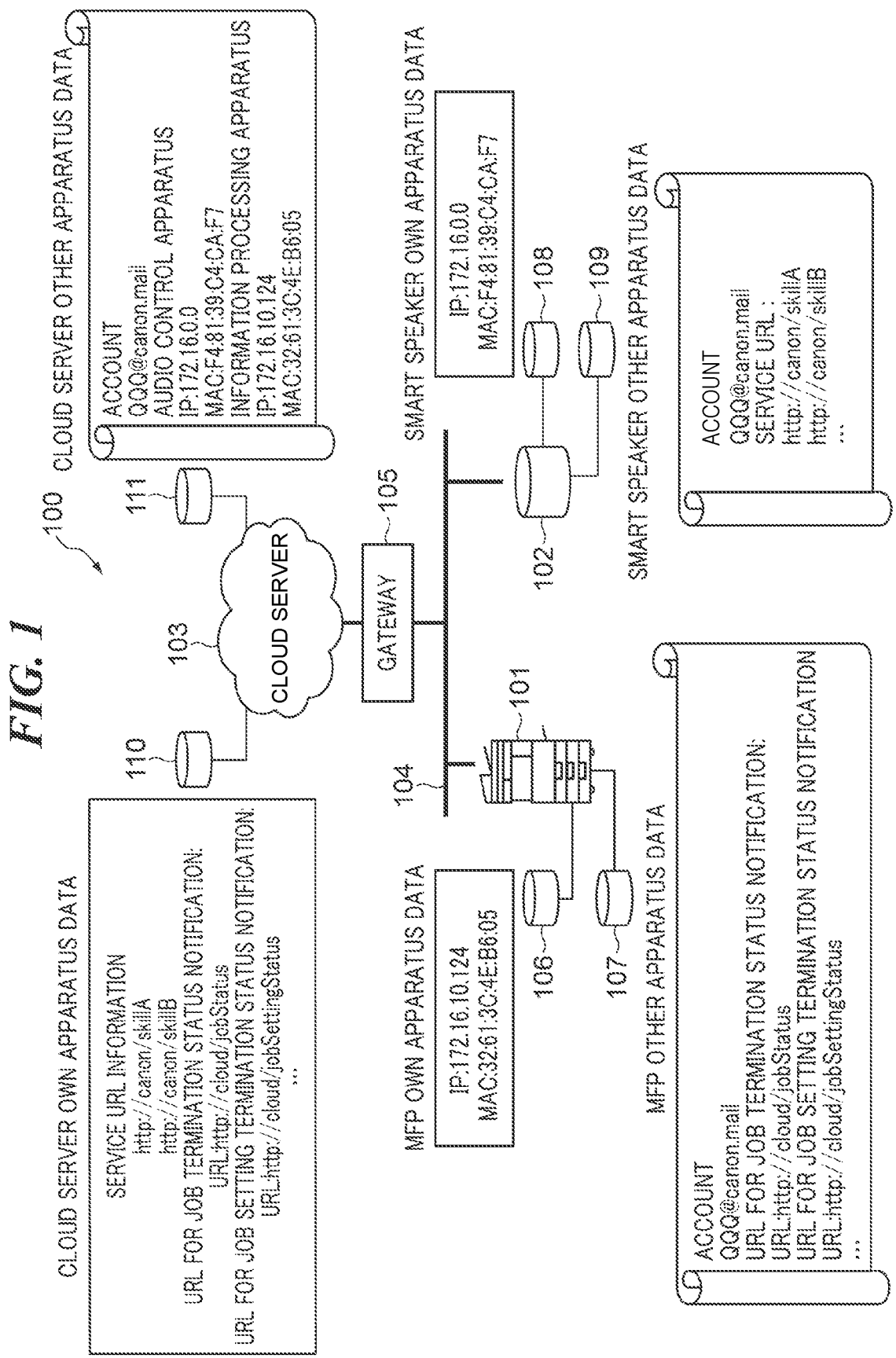
FIG. 1 is a diagram of the whole configuration of an information processing system according to embodiments of the present invention.

FIG. 1 is a diagram of the whole configuration of an information processing system 100 according to embodiments of the present invention.

Referring to FIG. 1, the information processing system 100 is comprised of a Multi-Function Peripheral (hereinafter referred to as the MFP) 101 that has a print function and a scan function as an information processing apparatus, a smart speaker 102 as an audio control apparatus, and a cloud server 103. The MFP 101 and the smart speaker 102 are capable of communicating with each other via a network 104. Further, the cloud server 103 is capable of communicating with the MFP 101 and the smart speaker 102 via a gateway 105 and the network 104.

In the information processing system 100, the cloud server 103 stores data of services, such as "job execution" and "job configuration", for operating the MFP 101 from the smart speaker 102. Further, the cloud server 103 receives predetermined voice data from the smart speaker 102 via the network 104.

Upon receipt of the voice data, the cloud server 103 executes a service associated with the voice data, and transmits device operation data generated by the service to the MFP 101 via the network 104.

Upon receipt of the device operation data from the cloud server 103, the MFP 101 executes a process associated with the device operation data. The MFP 101 transmits a response of the executed process to the cloud server 103 via the network 104.

Upon receipt of the response of the executed process from the MFP 101, the cloud server 103 generates response message data, and transmits the response message data to the smart speaker 102 via the network 104.

Upon receipt of the response message data from the cloud server 103, the smart speaker 102 produces voice corresponding to the response message data.

The MFP 101 stores information, such as MFP other apparatus data 107 and MFP own apparatus data 106.

The MFP other apparatus data 107 is formed by account information of a user who uses services, URL information for response notifications used for notifying the cloud server 103 of results of the services, and so forth.

The MFP own apparatus data 106 is formed by an IP address and a MAC address for accessing the MFP 101 via the network 104.

The smart speaker 102 stores information, such as smart speaker other apparatus data 109 and smart speaker own apparatus data 108.

The smart speaker other apparatus data 109 is formed e.g. by account information for using services, a service start word, a service URL of the cloud server 103 associated with the service start word, and so forth.

The smart speaker own apparatus data 108 is formed e.g. by an IP address and a MAC address for accessing the smart speaker 102 via the network 104.

The cloud server 103 stores service URL information for the MFP 101 and the smart speaker 102 to use services of the cloud server 103 via the network 104.

The cloud server 103 stores information, such as cloud server own apparatus data 110 and cloud server other apparatus data 111.

The cloud server own apparatus data 110 includes URL information for response notifications for the MFP 101 to notify the cloud server 103 of results of the services of the cloud server 103.

The cloud server other apparatus data 111 is formed e.g. by account information of a user who uses services, and the IP addresses and MAC addresses of the MFP 101 and the smart speaker 102 which are used in the information processing system 100.

The cloud server 103 communicates with the MFP 101 and the smart speaker 102 by using respective associated IP addresses and MAC addresses stored in the cloud server other apparatus data 111.

The network 104 transmits voice data acquired by the smart speaker 102 to the cloud server 103. Further, the network 104 transmits various data from the cloud server 103 to the smart speaker 102 and transmits various data e.g. of a print job and a scan job, from the cloud server 103 to the MFP 101.

The gateway 105 is e.g. a wireless LAN router conforming to the IEEE 802.11 standard series. However, the gateway 105 may have a capability of operating according to another wireless communication method. Further, the gateway 105 is not necessarily required to be a wireless LAN router, but may be e.g. a wired LAN router conforming to an Ethernet standard represented e.g. by 10BASE-T, 100BASE-T or 1200BASE-T. This gateways 105 may have a capability of operating according to another wired communication method. Note that the above-mentioned IEEE 802.11 standard series include a series of standards belonging to the IEEE 802.11, such as IEEE 802.11a and IEEE 802.11b.

Note that the present invention is not limited to the embodiments described below, and not all combinations of features described in the embodiments are absolutely essential to the solution according to the invention.

Figure 2:
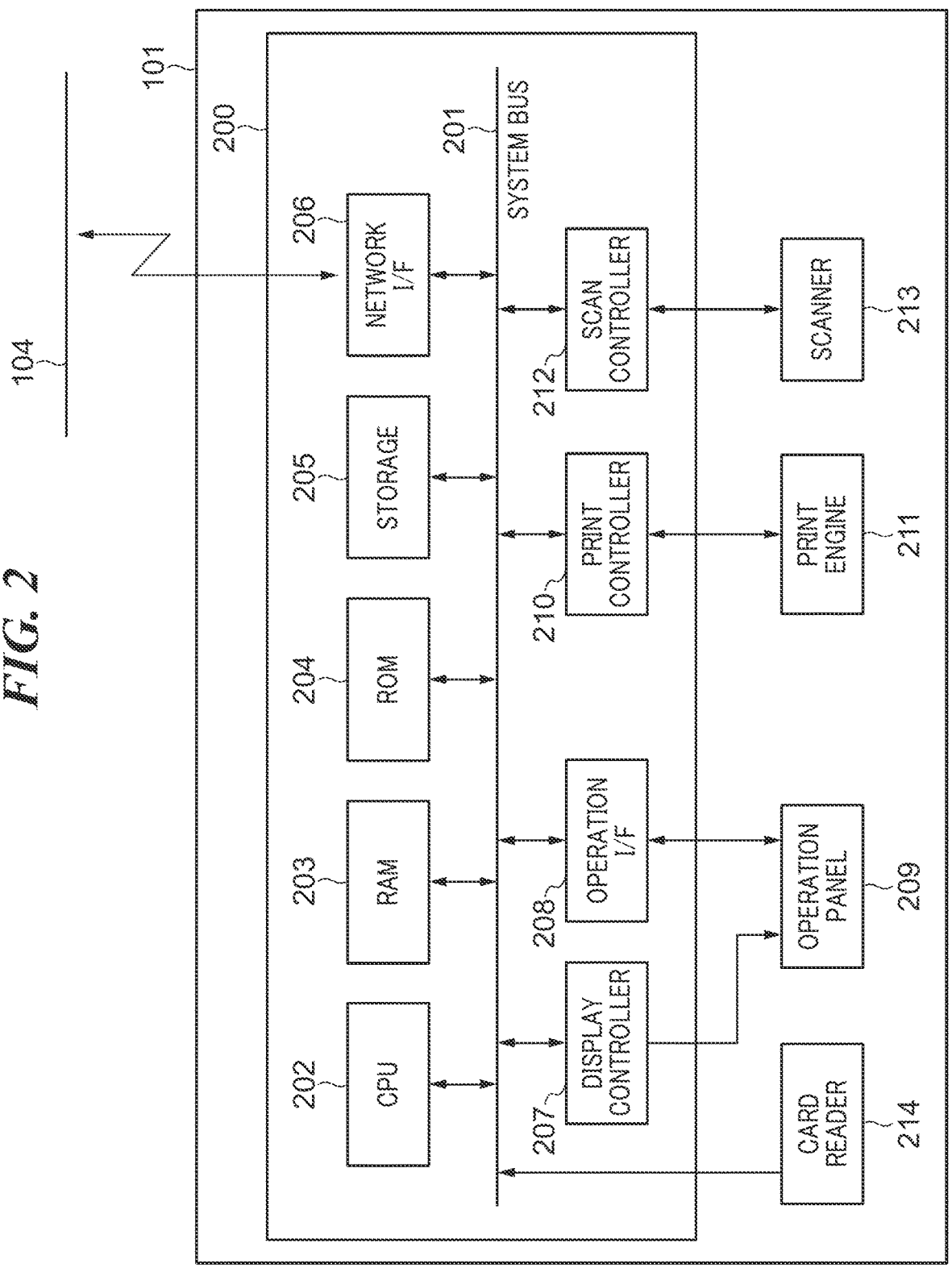
FIG. 2 is a schematic block diagram showing a hardware configuration of an MFP (Multi-Function Peripheral) appearing in FIG. 1.

FIG. 2 is a schematic block diagram showing a hardware configuration of the MFP 101.

Referring to FIG. 2, the MFP 101 is comprised of a controller 200, and an operation panel 209, a print engine 211, a scanner 213, and a card reader 214, which are connected to the controller 200.

The controller 200 includes a CPU 202, a RAM 203, a ROM 204, a storage 205, a network interface 206, a display controller 207, an operation interface 208, a print controller 210, and a scan controller 212. The components of the controller 200 are connected to a system bus 201, and are capable of communicating with each other.

The CPU 202 controls the overall operation of the MFP 101. The CPU 202 performs various types of control, such as reading, control and print control, by reading out control programs stored in the ROM 204 or the storage 205.

The RAM 203 is a volatile memory, and is used as a main storage memory and a work area for the CPU 202, and a temporary storage area for loading the control programs stored in the ROM 204.

The ROM 204 is a nonvolatile memory, and stores control programs which can be executed by the CPU 202.

The storage 205 is a storage device (e.g. a hard disk drive; HDD) having a larger capacity than the RAM 203, and stores print data, image data, various programs, and various setting information (e.g. MFP other apparatus data 107 and MFP own apparatus data 106). Note that the storage 205 may be a solid state drive (SSD) or it may be replaced by another storage device having the same function as the HDD.

Although the MFP 101 of the present embodiment has a configuration in which one CPU 202 performs processes of flowcharts, described hereinafter, using one memory (RAM 203), any other configuration may be employed. For example, the MFP 101 can be configured to perform the processes of the flowcharts, by causing a plurality of CPUs, RAMs, ROMs, and storages to cooperate with each other. Further, part of the processes may be performed using a hardware circuit, such as an ASIC (Application Specific Integrated Circuit) or an FPGA (Field-Programmable Gate Array).

The network interface 206 is for causing the MFP 101 to communicate with an external apparatus via the network 104. Further, the MFP 101 analyzes print data received via the network interface 206 using a software module (PDL analysis section, not shown) stored in the storage 205 or the ROM 204, for analyzing the print data. The PDL analysis section generates data to be printed by the print engine 211 based on print data expressed in one of various types of page description languages.

The display controller 207 is connected to the operation panel 209 and the card reader 214. When the user displays a screen controlled by the operation interface 208 on the operation panel 209, and operates the operation panel 209, the CPU 202 acquires an event associated with the user operation via the display controller 207.

The operation panel 209 is formed by a touch panel. The operation panel 209 displays a screen controlled by the operation interface 208, and detects a user input to the screen.

The print controller 210 is connected to the print engine 211. Image data to be printed is transferred to the print engine 211 via the print controller 210. The print engine 211 receives a control command and the image data to be printed, and forms an image based on the image data on a sheet. The priming method of the print engine 211 may be an electrophotographic method or an inkjet method. In the case of the electrophotographic method, the print engine 211 forms an electrostatic latent image on a photosensitive member, then develops the electrostatic latent image with toner, transfers the toner image onto a sheet, and fixes the transferred toner image to thereby form an image. On the other hand, in the case of the inkjet method, the print engine 211 discharges ink to form an image on a sheet.

The scan controller 212 is connected to the scanner 213. The scanner 213 reads an image on the sheet, and generates image data. The image data generated by the scanner 213 is stored in the storage 205. Further, the MFP 101 is capable of forming an image on a sheet by transferring the image data generated by the scanner 213 to the print engine 211. The scanner 213 includes a document feeder (not shown) and is capable of causing sheets placed on the document feeder to be conveyed, one by one, to thereby read an image on each of them.

When the user moves a smart card to the vicinity of the card reader 214, the card reader 214 reads information from the smart card to perform user authentication. If the user authentication by the card reader 214 is successful, the user is enables to use a plurality of functions of the MFP 101, such as a copy function, the print function, and the scan function.

Figure 3:
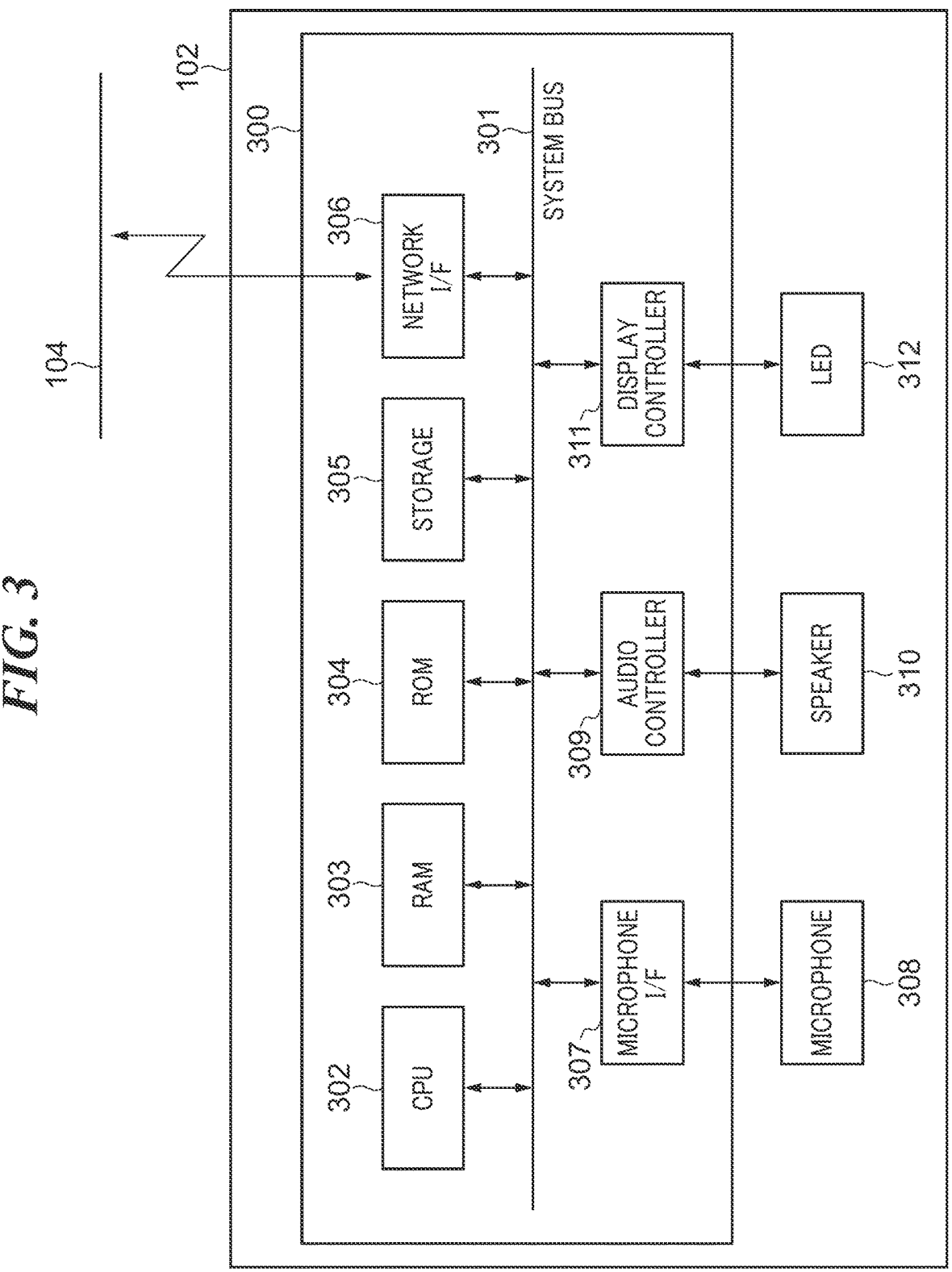
FIG. 3 is a schematic block diagram showing a hardware configuration of a smart speaker appearing in FIG. 1.

FIG. 3 is a schematic block diagram showing a hardware configuration of the smart speaker 102.

Referring to FIG. 3, the smart speaker 102 includes a controller 300, and as devices accompanying the controller 300, includes a microphone 308 as a voice input device, a speaker 310 as a voice output device, and an LED 312 as a notification device.

The controller 300 includes a CPU 302, a RAM 303, a ROM 304, a storage 305, a network interface 306, a microphone interface 307, an audio controller 309, and a display controller 311. The components of the controller 300 are connected to a system bus 301, and are capable of communicating with each other.

The CPU 302 is a central processing unit that controls the overall operation of the controller 300.

The RAM 303 is a volatile memory, and is used as a main storage memory and a work area for the CPU 302, and a temporary storage area for loading control programs stored in the storage 305.

The ROM 304 is a nonvolatile memory, and stores a boot program for the CPU 302.

The storage 305 is a storage device (e.g. an SD card) having a larger capacity than the RAM 303. The storage 305 stores a control program executed thereby for controlling the smart speaker 102. Note that the storage 305 may be replaced e.g. by a flash ROM other than the SD card or another storage device having a function equivalent to that of the SD card.

When the CPU 302 is started by power on, the CPU 302 executes the boot program stored in the ROM 304. By executing this boot program, the CPU 302 reads out the control program from the storage 305 and loads it into the RAM 303. After execution of the boot program, the CPU 302 subsequently executes the control program loaded into the RAM 303 to perform control of the smart speaker 102. Further, the CPU 302 also stores data used for execution of the control program in the RAM 303 and performs reading of data therefrom and writing of data therein. The CPU 302 can further store various settings necessary for execution of the control program in the storage 305 and perform reading of settings therefrom and writing of settings therein.

The network interface 306 is for causing the smart speaker 102 to communicate with an external apparatus via the network 104. The network interface 306 is configured to include a circuit and an antenna for performing communication according to a wireless communication method conforming to one of the IEEE 802.11 standard series. However, the communication method of the network interface 306 is not limited to the wireless communication method, but it may be a wired communication method conforming to the Ethernet standard.

The microphone interface 307 is connected to the microphone 308, converts voice uttered by the user and input from the microphone 308 into encoded voice data, and stores the voice data in the RAM 303 according to a instruction from the CPU 302.

Although in the present embodiment, the microphone 308 is a compact MEMS microphone for being mounted on a smart phone or the like, the microphone 308 may be replaced by any other device insofar as it is capable of acquiring user's voice. Further, it is desirable that three or more microphones 308 are arranged for use at predetermined locations such that an incoming direction of voice from the user can be determined. However, the information processing system 100 of the present invention can be realized even by a single microphone 308, and hence it is not necessarily required to dispose three or more microphones 308.

The audio controller 309 is connected to the speaker 310, converts voice data to an analog audio signal according to an instruction from the CPU 302, and outputs voice from the speaker 310.

The speaker 310 reproduces a response sound indicating that the smart speaker 102 is responding to voice uttered by the user, and voice synthesized by the cloud server 103. The speaker 310 is a general-purpose device for sound reproduction.

The display controller 311 is connected to the LED 312, and controls display of the LED 312 according to an instruction from the CPU 302. In the present embodiment, the display controller 311 mainly performs lighting control of the LED 312 for indicating that the smart speaker 102 is properly inputting the voice of the user. The LED 312 is, for example, a blue LED visible to the user. The LED 312 is a general-purpose device. Note that in the smart speaker 102, the LED 312 may be replaced by a display device capable of displaying characters and pictures.

Figure 4:
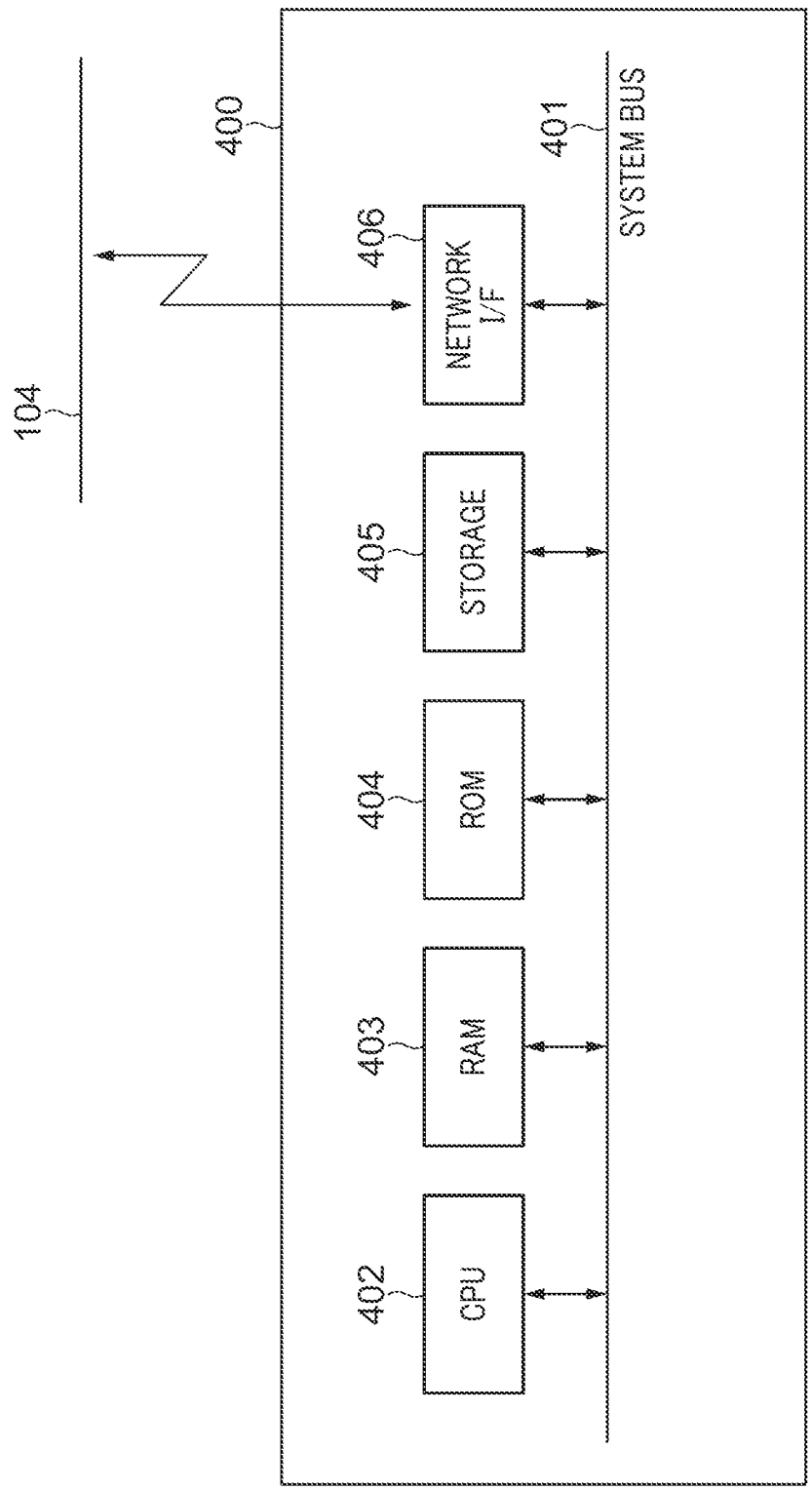
FIG. 4 is a schematic block diagram showing a hardware configuration of a controller of a cloud server appearing in FIG. 1.

FIG. 4 is a schematic block diagram showing a hardware configuration of a controller 400 of the cloud server 103.

Referring to FIG. 4, the controller 400 includes a CPU 402, a RAM 403, a RUM 404, a storage 405, and a network interface 406. The components of the controller 400 are connected to a system bus 401 and are capable of communicating with each other.

The CPU 402 is a central processing unit that controls the overall operation of the controller 400.

The RAM 403 is a volatile memory.

The ROM 404 is a nonvolatile memory and stores a boot program for the CPU 402.

The storage 405 is a storage device (e.g. a hard disk drive: HDD) having a larger capacity than the RAM 403. The storage 405 stores a control program executed thereby for controlling the cloud server 103. Note that the storage 405 may be a solid state drive (SSD), or it may be replaced by another storage device having a function equivalent to that of the HDD.

When the CPU 402 is started by power on, the CPU 402 executes the boot program stored in the ROM 404. By executing this boot program, the CPU 402 reads out the control program from the storage 405 and loads it into the RAM 403. After execution of the boot program, the CPU 402 subsequently executes the control program loaded into the RAM 403 to perform control of the cloud server 103. Further, the CPU 402 also stores data used for execution or the control program in the RAM 403, and performs reading of data therefrom and writing of data therein. The CPU 402 can further store various settings necessary for execution of the control program in the storage 405 and perform reading of settings therefrom and writing of settings therein.

The network interface 406 is for causing the cloud server 103 to communicate with an external apparatus via the network 104.

Figure 5:
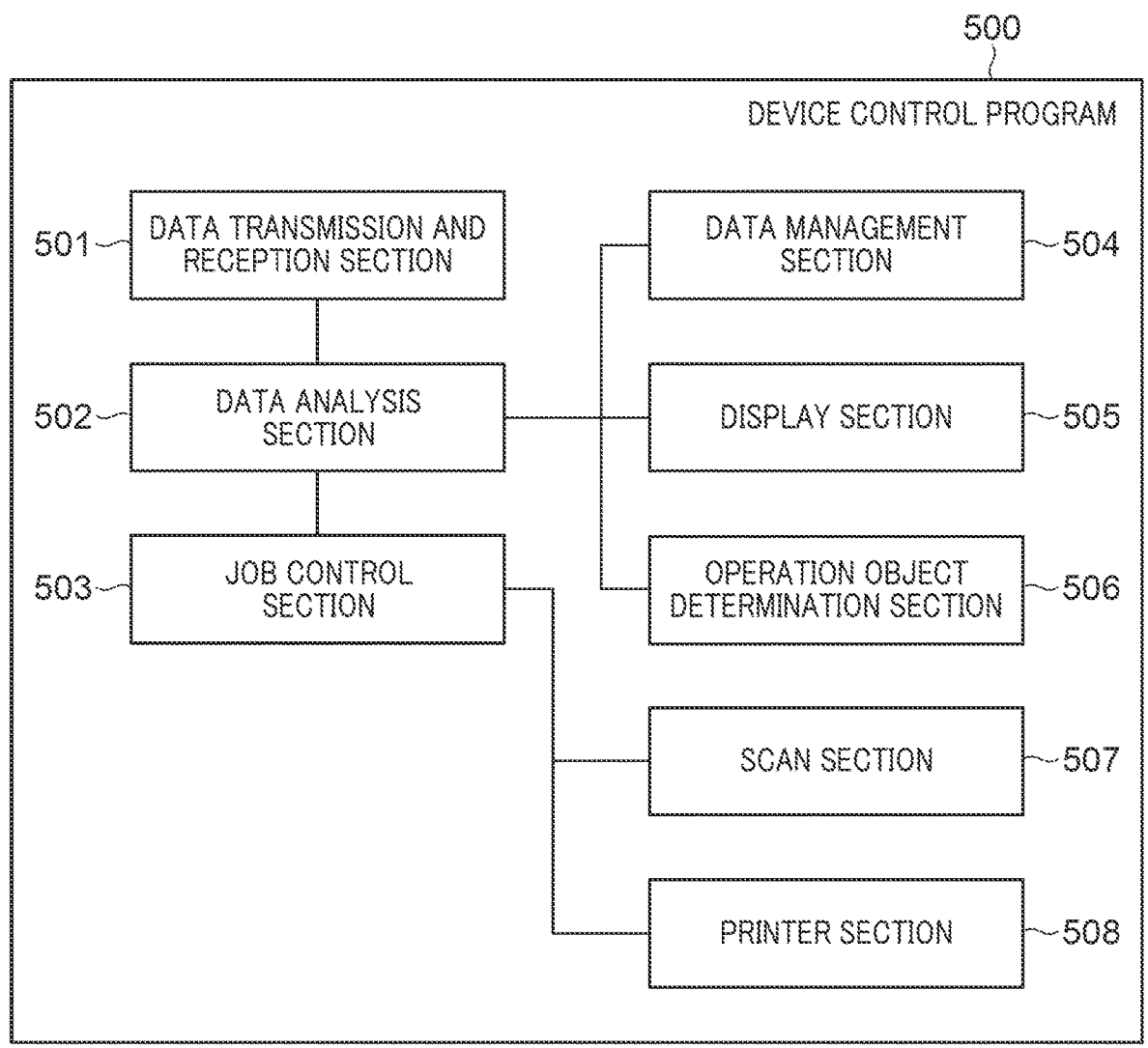
FIG. 5 is a functional block diagram of a device control program of the MFP.

FIG. 5 is a functional block diagram of a device control program 500 executed by the MFP 101.

The device control program 500 is one of the above-mentioned control programs stored in the ROM 204. When the CPU 202 is started, the CPU 202 loads the device control program 500 into the RAM 203, for execution.

Referring to FIG. 5, the device control program 500 includes a data transmission and reception section 501, a data analysis section 502, a job control section 503, a data management section 504, a display section 505, an operation object determination section 506, a scan section 507, and a primer section 508.

The data transmission and reception section 501 transmits and receives data to and from the smart speaker 102 and the cloud server 103, which are directly or indirectly connected to the network 104, by TCP/IP, via the network interface 206. The data transmission and reception section 501 receives device, operation data generated by the cloud server 103. Further, the data transmission and reception section 501 transmits, to the cloud server 103, job execution results, screen update notifications indicating that contents of response of device operation results displayed on a screen have been updated, and job execution state notifications indicating job statuses. Details of the screen update notifications and the job execution state notifications will be described hereinafter with reference to sequence diagrams shown in FIGS. 8, 14, and 15.

The data analysis section 502 converts the device operation data received by the data transmission and reception section 501 as well as job parameters and a job starting instruction received from the operation object determination section 506, to commands communicated between the modules of the device control program 500. Then, the data analysis section 502 transmits the converted commands to at least one associated one of the job control section 503, the data management section 504, and the display section 505.

The job control section 503 instructs the printer section 508 to control the print engine 211 via the print controller 210, and instructs the scan section 507 to control the scanner 213 via the scan controller 212. For example, in a case where the operation object determination section 506 detects depression of a start key on a copy function screen while the display section 505 is displaying the copy function screen on the operation panel 209, the data analysis section 502 receives job parameters and a job starting instruction of a copy job from the operation object determination section 506. The data analysis section 502 generates a scan command including scan job parameters and a print command including print job parameters from the received job parameters. Then, the data analysis section 502 transmits the generated scan command to the scan section 507 and transmits the generated print command to the printer section 508. With this, the image data generated by the scanner 213 is controlled to be printed on a sheet by the print engine 211. Note that the mechanisms of the scan control and the print control are not the point of the present embodiment, and hence further description thereof is omitted.

The data management section 504 stores various data, such as work data generated by executing the device control program 500, and configuration parameters (MFP configuration information) necessary for controlling the devices, in predetermined areas of the RAM 203 and the storage 205, and manages the various data. For example, job data formed by combining parameter setting items, described hereinafter, of various jobs generated by the job control section 503 and settings of the parameter setting items, and display language setting information, which is information on a language displayed on the operation panel 209, are stored and managed by the data management section 504. Further, the data management section 504 stores and manages authentication information required for communication with the gateway 105, and device information required for communication with the cloud server 103. Further, the data management section 504 stores and manages image data of an image to be formed by the MFP 101. Further, the data management section 504 manages screen control information used for screen display control by the display section 505, and operation object determination information used by the operation object determination section 506 for determining an operation object, for each screen of the operation panel 209, which is subjected to display control by the display section 505.

Furthermore, the data management section 504 stores and manages a logged-in user information table 2001 and a user login flag. In the present embodiment, as shown in FIG. 20, the logged-in user information table 2001 is comprised of a list of record information items on respective users, each including a user ID (identification information), a user name, used language information of a user, and available function restriction information of the user. Note that the logged-in user information table 2001 may include smart speaker information set on a user-by-user basis, such as speaking speed (fast to slow) of the smart speaker 102, gender (male, female, asexual), voice pitch (high to low), and character (child, old person, robot). Further, the data management section 504 also stores and manages a country setting table 2101, a locale code table 2102, and a locale code lookup table 2103, shown in FIGS. 21A to 21C, respectively. Note that the country setting table 2101 is stored in the RAM 203 in a state in which a single country in the table has been selected.

Further, the data management section 504 stores an audio volume setting table 2104 and an audio volume setting lookup table 2105, shown in FIGS. 21D and 21E, respectively, in the RAM 203, and manages the two tables 2104 and 2105.

The display section 505 performs control of the operation panel 209 via the display controller 207. More specifically, the user displays UI components (e.g. buttons, pull-down lists, check boxes) that the user can operate, on the operation panel 209. The display section 505 updates a screen of the operation panel 209 based on screen display control information and a language setting stored by the data management section 504. More specifically, for this update, the display section 505 acquires a language dictionary associated with the language setting stored by the data management section 504 from the storage 205, and updates the screen of the operation panel 209 to a screen comprised of text data based on the language dictionary.

The operation object determination section 506 acquires touch coordinates of the operation panel 209 via the operation interface 208, and determines a UI component located at the coordinates as an object which the user is currently operating. Further, in a case where the smart card held by the user enters a communicable area of the card reader 214, the operation object determination section 506 determines the smart card as an object which the user is currently operating.

Further, the operation object determination section 506 reads out screen display control information associated with the UI component determined as the object which the user is currently operating, and determines processing to be performed when an operation of the object is received, based on the screen display control information. For example, the operation object determination section 506 gives an instruction for updating contents displayed on the screen of the operation panel 209, to the display section 505, and transmits parameters of a job set by the user operation and an instruction for starting the job to the data analysis section 502.

The scan section 507 performs scanning by the scanner 213 via the scan controller 212, based on a scan job parameter setting transmitted from the job control section 503, and the data management section 504 stores scanned image data.

The printer section 508 performs printing by the print engine 211 via the print controller 210, based on print job parameter settings transmitted from the job control section 503.

Figure 6:
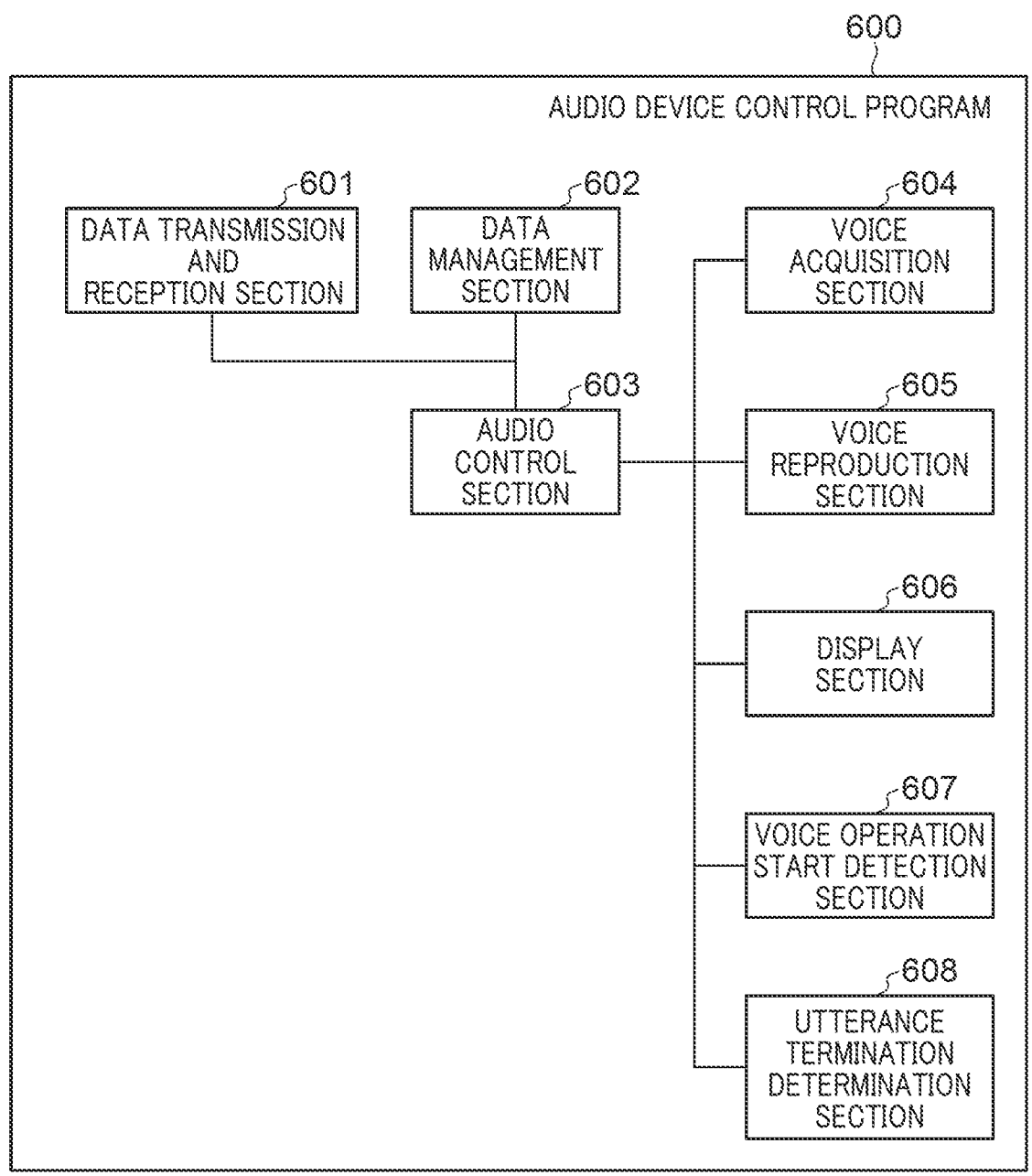
FIG. 6 is a functional block diagram of an audio device control program of the smart speaker.

FIG. 6 is a functional block diagram of an audio device control program 600 of the smart speaker 102.

The audio device control program 600 is one of the above-mentioned control programs stored in the storage 305, and is loaded into the RAM 303 and executed by the CPU 302 at the startup of the smart speaker 102.

Referring to FIG. 6, the audio device control program 600 includes a data transmission and reception section 601, a data management section 602, an audio control section 603, a voice acquisition section 604, a voice reproduction section 605, a display section 606, a voice operation start detection section 607, and an utterance termination determination section 608.

The data transmission and reception section 601 transmits and receives data to and from the MFP 101 and the cloud server 103, which are directly or indirectly connected to the network 104, by TCP/IP via the network interface 306. The data transmission and reception section 601 transmits the voice data acquired from an utterance of the user by the voice acquisition section 604, to the cloud server 103, and receives from the cloud server 103 voice synthesis data, which is generated by the cloud server 103 as a response to the user.

The data management section 602 stores various data, such as work data generated by executing the audio device control program 600, in a predetermined area of the storage 305, and manages the various data. Here, the data stored and managed by the data management section 602 includes audio volume setting data of voice to be reproduced by the voice reproduction section 605 and authentication information required for communication with the gateway 105. Furthermore, the data management section 602 stores and manages device information required for communication with the MFP 101 and the cloud server 103 and so forth.

The voice acquisition section 604 converts analog voice of the user, which is acquired by the microphone 308 from the user in the vicinity of the smart speaker 102, to voice data, and then temporarily stores the voice data in the RAM 303. More specifically, the voice acquisition section 604 converts the analog voice of the user to voice data in a predetermined format, such as MP3, and then temporarily stores the encoded voice data in the RAM 303, for transmission to the cloud server 103. The timing of starting the processing of the voice acquisition section 604 and that of terminating the same are managed by the audio control section 603. Further, the predetermined format of encoding may be a general-purpose streaming format. In this case, the configuration may be such that the voice acquisition section 604 sequentially transmits the encoded voice data to the data transmission and reception section 601 and the data transmission and reception section 601 transmits the voice data to at least one of the MFP 101 and the cloud server 103.

The voice reproduction section 605 reproduces the voice synthesis data (voice message) received by the data transmission and reception section 601 using the speaker 310 via the audio controller 309. The timing of reproducing the voice synthesis data by the voice reproduction section 605 is managed by the audio control section 603.

The display section 606 displays the LED 312 via the display controller 311. For example, in a case where the voice operation start detection section 607 has detected the start of a voice operation, the display section 606 performs lighting control of the LED 312. The timing of displaying the LED 312 by the display section 606 is managed by the audio control section 603.

The voice operation start detection section 607 detects a wake word uttered by the user or the depression of an operation start key (not shown) of the smart speaker 102, and transmits an operation start notification to the audio control section 603. Here, the wake word refers to an audio word determined in advance. The voice operation start detection section 607 continually listens for an analog voice acquired by the microphone 308 from the user in the vicinity of the smart speaker 102, so as to detect a wake word from the analog voice. The voice operation start detection section 607 continually listens for an analog voice acquired by the microphone 308 from the user in the vicinity of the smart speaker 102, so as to detect a wake word from the analog voice. The user can operate the MFP 101 by speaking the wake word and then speaking what the user himself/herself desires to perform. Voice processing performed after the voice operation start detection section 607 has detected the wake word will be described hereinafter.

The utterance termination determination section 608 determines the timing of termination of the processing of the voice acquisition section 604. For example, when a time period during which the user utters no word (hereinafter referred to as a "blank time") has reached a predetermined time period (e.g. three seconds) after the analog voice of the user was acquired by the voice acquisition section 604, the utterance termination determination section 608 determines that the utterance of the user has been terminated, and transmits an utterance termination notification to the audio control section 603. Note that the determination of the termination timing may be performed not only based on the blank time but also based on a predetermined word uttered by the user. For example, it is possible to set in advance words, such as "YES", "NO", "OK", "CANCEL", "TERMINATE" and "START" as predetermined words. With this setting, in a case where any of such predetermined words is uttered by the user, it may be determined that the utterance of the user has been terminated before the blank time reaches the predetermined time period. Further, the determination of the termination timing may be performed not by the smart speaker 102 but by the loud server 103, and termination of the utterance of the user may be determined based on the meaning or context of the utterance of the user.

The audio control section 603 is the center of control by the audio device control program 600 and controls the other modules of the audio device control program 600 such that they operate in cooperation with each other. More specifically, the audio control section 603 controls the start and termination of processing of the voice acquisition section 604, the voice reproduction section 605, and the display section 606. Further, after the voice data is acquired by the voice acquisition section 604, the audio control section 603 controls the data transmission and reception section 601 to transmit the voice data to the cloud server 103. Further, after the voice synthesis data from the cloud server 103 is received by the data transmission and reception section 601, the audio control section 603 controls the voice reproduction section 605 to reproduce the voice synthesis data.

Here, a description will be given of the timing of starting or terminating the processing of the voice acquisition section 604, the voice reproduction section 605, and the display section 606.

Upon receipt of the operation start notification from the voice operation start detection section 607, the audio control section 603 starts the processing of the voice acquisition section 604. Further, upon receipt of the utterance termination notification from the utterance termination determination section 608, the audio control section 603 terminates the processing of the voice acquisition section 604.

For example, ha it be assumed that the user utters a wake word, and then speaks "I want to copy". At this time, the voice operation start detection section 607 detects the analog voice of the wake word, and transmits an operation start notification to the audio control section 603. Upon receipt of the operation start notification, the audio control section 603 causes the voice acquisition section 604 to start processing to thereby start a dialogue session with the user. The voice acquisition section 604 which has thus started the processing acquires the analog voice "I want to copy" uttered by the user, converts the analog voice to voice data, and then temporarily stores the converted voice data in the RAM 303.

After that, when the utterance termination determination section 608 determines that a blank time, which has elapsed after the voice acquisition section 604 acquired the analog voice "I want to copy", has reached a predetermined time period, the utterance termination determination section 608 transmits an utterance termination notification to the audio control section 603. Upon receipt of the utterance termination notification, the audio control section 603 causes the voice acquisition section 604 to terminate the processing. Hereafter, the state of the smart speaker 102 after the audio control section 603 has caused the voice acquisition section 604 to start the processing until it causes the voice acquisition section 604 to terminate the processing is referred to as an utterance processing state. The audio control section 603 controls the display section 606 to light the LED 312 during the utterance processing state of the smart speaker 102 to indicate the utterance processing state.

Upon receipt of the utterance termination notification from the utterance termination determination section 608, the audio control section 603 transmits the voice data temporarily stored in the RAM 202 by the voice acquisition section 604, to the cloud server 103 using the data transmission and reception section 601. Then, the audio control section 603 waits for the data transmission and reception section 601 to receive a response message from the cloud server 103. Here, the response message from the cloud server 103 includes, for example, a header section indicating that the message is a response, and voice synthesis data. When the data transmission and reception section 601 receives the response message from the cloud server 103, the audio control section 603 causes the voice reproduction section 605 to reproduce voice synthesis data (e.g. "Copy screen will be displayed.") included in the response message. Afterwards, when the data transmission and reception section 601 receives a dialogue session termination notification from the cloud server 103 simultaneously with a response message, the audio control section 603 causes the voice reproduction section 605 to reproduce voice synthesis data (e.g. "Copy has been terminated.") included in the response message. Further, the audio control section 603 terminates the dialogue session with the user according to the received dialogue session termination notification. Note that the state of the smart speaker 102 after the audio control section 603 has received the utterance termination notification from the utterance termination determination section 608 until it receives the dialogue session termination notification from the cloud server 103 is referred to as a response processing state. The audio control section 603 controls the display section 606 to blink the LED 312 in the response processing state.

Even after the audio control section 603 receives the utterance termination notification, the user can continue to utter what the user desires to perform using the MFP 101 in succession to the utterance of "I want to copy", without uttering the wake word again, so long as the dialogue session with the user continues. Note that the termination of the dialogue session is determined by the cloud server 103, and the dialogue session termination notification is transmitted from the cloud server 103 to the smart speaker 102. When the dialogue session termination notification is received from the cloud server 103, the audio control section 603 controls the voice acquisition section 604 to terminate the dialogue session with the user. Hereinafter, the state of the smart speaker 102 after the audio control section 603 has caused the voice acquisition section 604 to terminate the dialogue session until it causes the voice acquisition section 604 to start the next dialogue session is referred to as a standby state. Further, the state of the smart speaker 102 after the startup thereof until the audio control section 603 receives the operation start notification from the voice operation start detection section 607 is always the standby state. The audio control section 603 controls the display section 606 to keep the LED 312 off during the standby state of the smart speaker 102.

Figure 7:
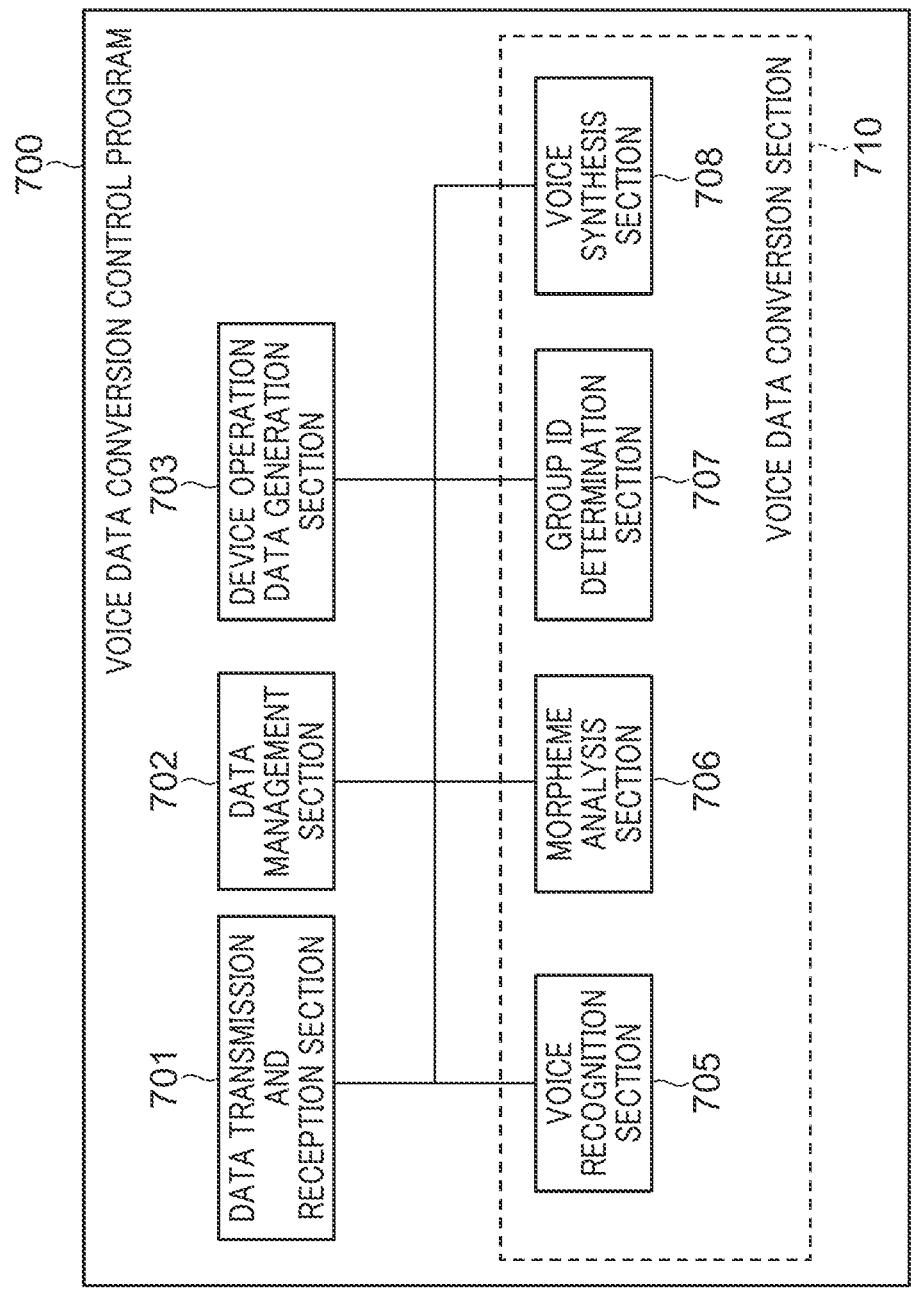
FIG. 7 is a functional block diagram of a voice data conversion control program of the cloud server.

FIG. 7 is a functional block diagram of a voice data conversion control program 700 of the cloud server 103.

The voice data conversion control program 700 is one of the above-mentioned control programs stored in the storage 405 and is loaded into the RAM 403 and executed by the CPU 402 at the startup of the cloud server 103.

Referring to FIG. 7, the voice data conversion control program 700 includes a data transmission and reception section 701, a data management section 702, a device operation data generation section 703, and a voice data conversion section 710. Further, the voice data conversion section 710 includes a voice recognition section 705, a morpheme analysis section 706, a group ID determination section 707, and a voice synthesis section 708.

The data transmission and reception section 701 transmits and receives data to and from the MFP 101 and the smart speaker 102 connected to the network 104, by TCP/IP via the network interface 406 and the gateway 105 outside the cloud server 103. The data transmission and reception section 701 receives voice data of the user from the smart speaker 102. Further, the data transmission and reception section 701 transmits a group ID determined by the group ID determination section 707 and text data generated by a voice recognition process by the voice recognition section 705.

The data management section 702 stores various data, such as work data generated by executing the voice data conversion control program 700, and data for the voice recognition process, which is used by the voice data conversion section 710, in a predetermined area of the storage 405, and manages the various data. Note that the data for the voice recognition process, which is stored and managed by the data management section 702, includes an acoustic model and a language model used for converting voice data to text by the voice recognition section 705, and dictionaries for analyzing morphemes of the text by the morpheme analysis section 706. Further, the data for the voice recognition process, which is managed by the data management section 702, also includes a group ID list used for determining a group ID by the group ID determination section 707 and a voice database used for voice synthesis by the voice synthesis section 708. Furthermore, the data management section 702 stores and manages device information required for communication with the smart speaker 102 and the MFP 101.

When voice data of the user is input to the voice recognition section 705 by the data transmission and reception section 701, the voice recognition section 705 performs the voice recognition process for converting the voice data to text. In the voice recognition process, the voice data of the user is converted to phonemes using an acoustic model and further the phonemes are convened to actual text data using a language model. Note that in the present embodiment, there may be provided a plurality of languages for the voice data of the user. Therefore, the voice recognition section 705 may employ a first voice recognition method in which the language of input voice data is determined and the phonemes are converted to text data based on the determined language. Further, the voice recognition section 705 may employ a second voice recognition method in which input voice data is convened to phonemes using acoustic models of the plurality of languages and further the phonemes are convened to text data on a language-by-language basis, using language models associated with the respective acoustic models, to output text data items. In the case of the second voice recognition method, since the input voice data is converted to text data items in the respective language forms, the voice recognition section 705 outputs a plurality of voice recognition data items formed by the text data items and language forms thereof, as results of the voice recognition process. Hereafter, in the present embodiment, a description will be given of the case where the second voice recognition method is employed.

In the present embodiment, the voice recognition section 705 performs voice recognition of the input voice data in the two language forms of Japanese and English. As a result, voice recognition data including text data formed by one or more katakana characters and a language setting of "Japanese", and voice recognition data including text data formed by one or more alphabetical characters and a language setting of "English" are output from the voice recognition section 705.

However, insofar as the voice data is converted to text, the voice recognition process employed by the voice recognition section 705 is not limited to the above. Details of the voice recognition process are not the point of the present embodiment, and hence further description thereof is omitted.

The morpheme analysis section 706 analyzes the morphemes of the text data included in the voice recognition data output from the voice recognition section 705 based on the associated language settings. More specifically, the morpheme analysis section 706 derives morpheme sequences included in the text data from dictionaries including information e.g. on the grammars and parts of speech of the set languages, and further determines the parts of speech and so forth of the respective morphemes. The morpheme analysis section 706 can be realized using known morpheme analysis software, such as JUMAN, Chazutsu, and MeCab.

Since the morpheme analysis software is a known technique, a detailed description thereof is omitted.

Hereafter, a description will be given of a first embodiment of the present invention.

Figure 8:
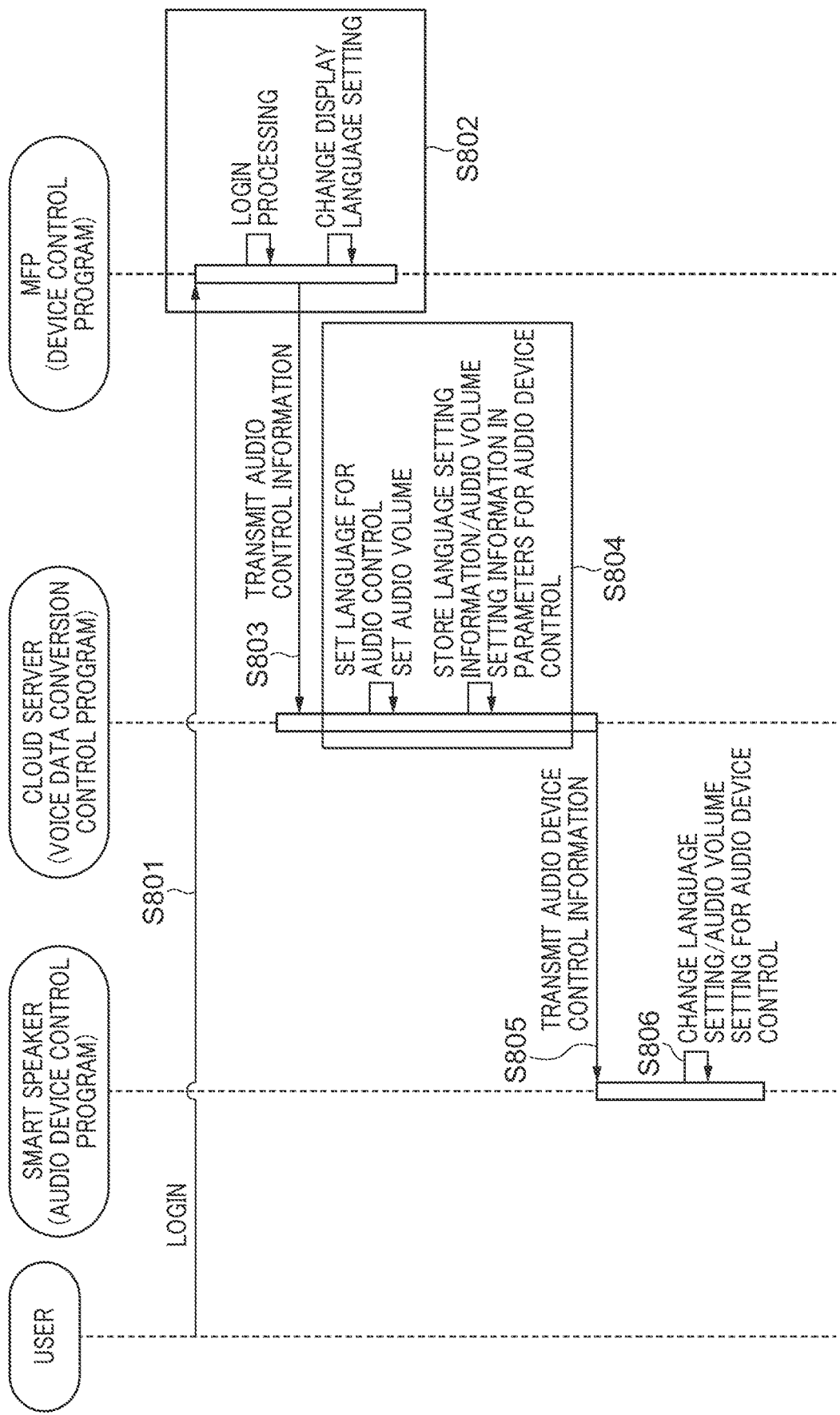
FIG. 8 is a diagram off control sequence according to a first embodiment, which is executed by the information processing system when a user logs into the MFP.

FIG. 8 is a diagram of a control sequence according to the first embodiment, which is executed by the information processing system 100 when a user logs into the MFP 101.

The present process is executed by exchanging data between the MFP 101, the smart speaker 102, and the cloud server 103, which form the information processing system 100. More specifically, during an authentication operation performed when the user logs into the MFP 101, the MFP 101 notifies the cloud server 103 and the smart speaker 102 of setting information stored in the MFP 101, whereby the settings of each of the cloud server 103 and the smart speaker 102 are changed.

In the example of the sequence shown in FIG. 8, the MFP 101, the cloud server 103, and the smart speaker 102 are in a state capable of communicating with each other. Further, the MFP 101 is in a state completed in initialization and displaying a home screen according to a default language setting, from which various functions, such as a copy function, a scan function, and a print function, can be called, after the startup of the MFP 101 by power on. Here, in the present embodiment, the default language is set to Japanese.

Hereinafter, operations executed by the MFP 101 are in actuality performed by the CPU 202 that executes the device control program 500 described hereinabove with reference to FIG. 5. Further, operations executed by the smart speaker 102 are in actuality performed by the CPU 302 that executes the audio device control program 600 described hereinabove with reference to FIG. 6. Similarly, operations executed by the cloud server 103 are in actuality performed by the CPU 402 that executes the voice data conversion control program 700 described hereinabove with reference to FIG. 7.

First, in a step S801, the MFP 101 receives a login operation by the user (operation of a first acquisition unit). Although in the present embodiment, the login operation refers to a user operation of moving a smart card to the vicinity of the card reader 214, this is not limitative. For example, a user operation of inputting the user name, password or personal identification number (PIN) of the user, or other information associated with the user, to the operation panel 209 may be the login operation.

In a step S802, first, the MFP 101 performs login processing according to the login operation received in the step S801. As a result, when authentication of the user is successful, next, the MFP 101 acquires audio control information (operation of a second acquisition unit). Here, the audio control information is information stored in the storage 205, which includes user information of the successfully authenticated user, and information to be notified to the cloud server 103 and the smart speaker 10 out of the MFP configuration information. Further, in a case where a language used by the user is included in the acquired user information, the MFP 101 changes the display language on the panel 209 to the language used by the user, and requests the cloud server 103 to change audio settings of the smart speaker 102 (operation of a first request unit).

In a step S803, the MFP 101 transmits the audio control information acquired in the step S802 to the cloud server 103 via the network interface 406. Details of the processing in the steps S801 to S803 will be described hereinafter with reference to FIG. 9.

In a step S804, when the data transmission and reception section 701 receives the audio control information transmitted in the step S803, the cloud server 103 changes settings (hereinafter referred to as the audio device control information) concerning voice, data processing according to the audio control information. Details of the processing in the step S804 will be described hereinafter with reference to a flowchart shown in FIG. 12.

In a step S805, the cloud server 103 transmits the audio device control information changed in the step S804, to the smart speaker 102 using the data transmission and reception section 701. With this, the cloud server 103 requests the smart speaker 102 to change the audio settings (operation of a request unit, operation of a second request unit).

In a step S806, when the smart speaker 102 receives the audio device control information transmitted in the step S805 using the data transmission and reception section 601, the smart speaker 102 chances settings, such as a locale setting and an audio volume setting, of the audio control section 603 according to the audio device control information (operation of a change unit). Details of the processing in the step S806 will be described hereinafter with reference to a flowchart shown in FIG. 13.

Figure 9:
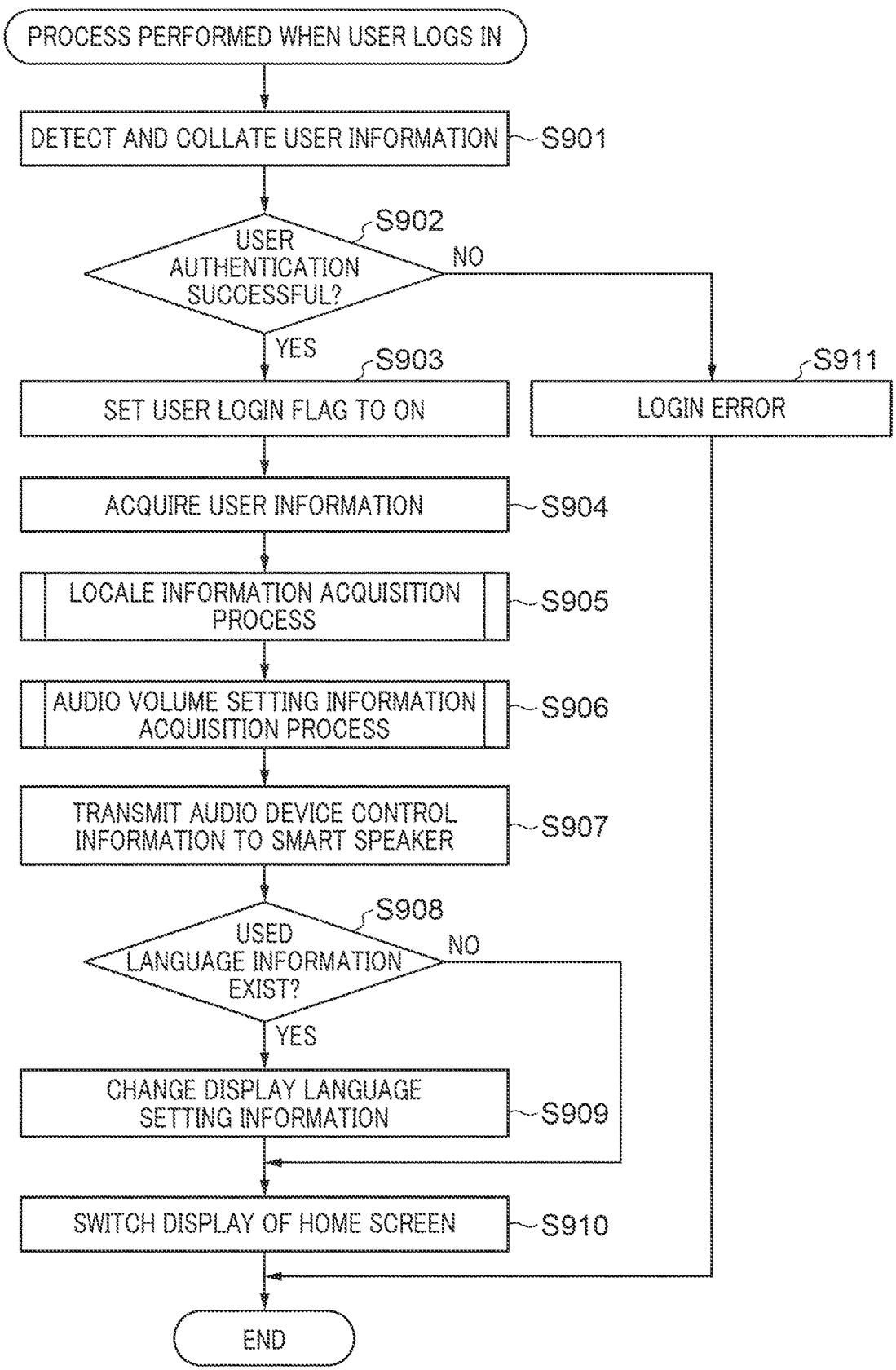
FIG. 9 is a flowchart of a process performed when the user logs into the MFP, which is executed by the MFP in steps in FIG. 8.

FIG. 9 is a flowchart of a process performed when the user logs into the MFP 101, which is executed by the device control program 500 of the MFP 101 in the steps S801 to S803 in FIG. 8. As described hereinafter, steps S901 and S907 correspond to the steps S801 and S803, respectively, and steps in FIG. 9, other than the S901 and S907 correspond to the step S802.

In the step S901, processing in the step S801 is executed. That is, when the smart card held by the user enters a communicable area of the card reader 214, the operation object determination section 504 detects the smart card by the card reader 214 and acquires user information. Next, the operation object determination section 506 collates the acquired user information with the logged-in user information table 2001 stored by the data management section 504.

As a result of the collation in the step S901, if there is information that matches the acquired user information, in a step S902, the data analysis section 502 determines that the authentication of the user is successful, and the process proceeds to a step S903, whereas if not, the data analysis section 502 determines that the authentication of the user is not successful, and the process proceeds to a step S911.

In the step S903, the data management section 504 sets the user login flag to ON indicating that the user is in a logged-in state, and stores the changed user login flag in the RAM 203.

In a step S904, the data management section 504 acquires the user information from the logged-in user information table 2001. For example, in a case where the logged-in user is a user whose identification ID is 1, the data management section 504 acquires record information including the identification ID of 1, as the user information, from the logged-in user information table 2001, and stores the record information in the RAM 203.

In a step S905, the data analysis section 502 executes a locale information acquisition process for acquiring locale information from the user information acquired by the data management section 504 in the step S904 and the MFP configuration information stored in the MFP 101. Details of the locale information acquisition process will be described hereinafter with reference to a flowchart shown in FIG. 10. The data analysis section 502 stores the acquired locale information in the RAM 203.

In a step S906, the data analysis section 502 acquires audio volume setting information from the MFP configuration information stored in the MFP 101. Details of an audio volume setting information acquisition process will be described hereinafter with reference to a flowchart shown in FIG. 11. The data analysis section 502 stores the acquired audio volume setting information in the RAM 203.

In the step S907, processing in the step S803 is executed. That is, the data transmission and reception section 501 transmits to the cloud server 103 audio control information including the user login flag, the user information, the locale information, and the audio volume setting information, which have been stored in the RAM 203 in the steps S903 to S906, respectively. Although in the present embodiment, the JSON data format shown in FIG. 22 is used for this transmission, this is not limitative. For example, another data format, such as XML, may be used. Further, in a case where smart speaker information is included in the logged-in user information table, the smart speaker information may be included in the audio control information.

In a step S908, the data analysis section 502 determines whether or not used language information is set in the user information acquired by the data management section 504 in the step S904. If the used language information is set therein, the process proceeds to a step S909, whereas if not, the process proceeds to a step S910.

In the step S909, the data analysis section 502 changes the display language setting information which is stored and managed by the data management section 504 as information on a language to be displayed on the operation panel 209, based on the used language information set in the user information.

In the step S910, the display section 505 refers to the display language setting information stored in the RAM 203, and changes display on the home screen of the operation panel 209 via the display controller 207, followed by terminating the present process. With this, the display language on the home screen of the operation panel 209 is changed to the language used by the logged-in user. This change will be described with reference to FIG. 19.

In the step S911, the display section 505 controls the display controller 207 to display a login error occurrence screen on the operation panel 209, followed by terminating the present process.

Figure 10:
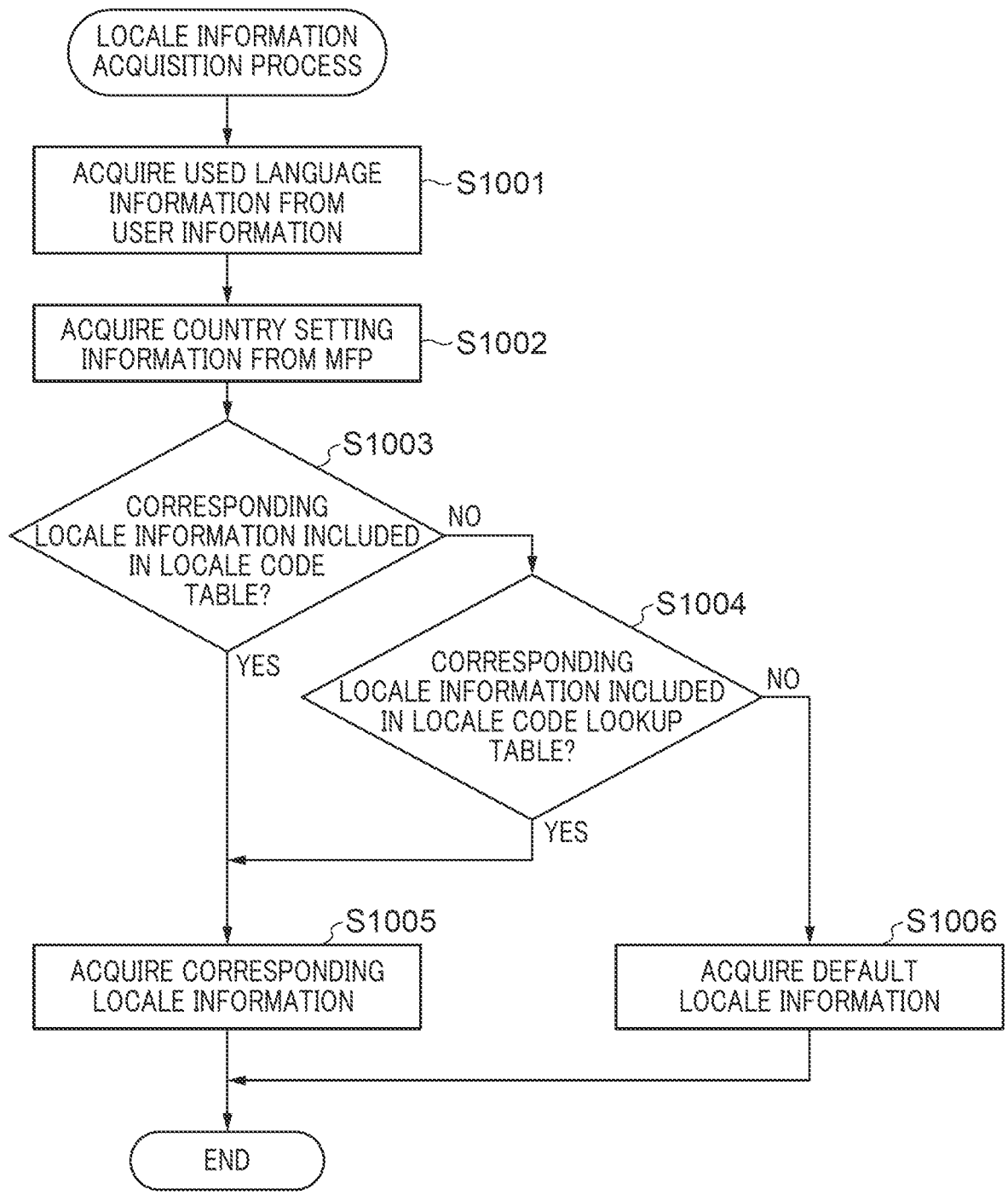
FIG. 10 is a is a flowchart of a locale information acquisition process performed by the MFP in a step in FIG. 9.

FIG. 10 is a flowchart of a locale information acquisition process performed by the device control program 500 of the MFP 101 in the step S905 in FIG. 9.

In a step S1001, used language information is acquired from the user information, i.e. the record information stored in the RAM 203 in the step S904 by the data management section 504. Here, a description will be given of a case where when the user having the identification ID of 1 has logged in, in the step S1001, "En" is acquired as used language information associated with the identification ID of 1 from the logged-in user information table 2001 in FIG. 20.

In a step S1002, country setting information is acquired which has been selected in the country setting table 2101 stored in the RAM 203 for management by the data management section 504.

In a step S1003, it is determined whether or not locale information formed by a combination of the used language information "En" and the country setting information, which have been acquired by the data analysis section 502 in the steps S1001 and S1002, exists in the locale code table 2102 stored in the RAM 203. If it is determined that the locale information exists in the locale code table 2102, the process proceeds to a step S1005, whereas if not, the process proceeds to a step S1004. For example, in a case where the country setting information acquired in the step S1002 is "United States" (which is denoted as US), it is determined that "En-US: English (United States)", which is formed by combining the country setting information "United States" and the used language information "En", exists in the locale code table 2102. Further, in a case where the country setting information acquired in the step S1002 is "Canada" (which is denoted as CA), it is determined that "En-CA: English (Canada)", which is, formed by combining the country setting information "Canada" and the used language information "En", exists in the locale code table 2102. On the other hand, for example, in a case where the country setting information acquired in the step S1002 is "Japan" it is determined that a locale information, which is formed by combining the country setting information "Japan" and the used language information "En", does not exist in the locale code table 2102.

In the step S1004, it is determined whether or not locale information associated with "En", which is the used language information acquired in the step S1001 by the data analysis section 502, is included in the locale code lookup table 2103 stored in the RAM 203. As shown in FIG. 21C, the locale information "En-US" associated with "En" is included in the locale code lookup table 2103, and hence in this case the process proceeds to the step S1005. On the other hand, if the used language information acquired in the step S1001 is not included in the locale code lookup table 2103, the process proceeds to a step S1006.

In the step S1005, the data analysis section 502 acquires the locale information which has been determined to exist in the locale code table 2102 in the step S1003, or the locale information which has been determined to exist in the locale code lookup table 2103 in the step S1004. At this time, the locale information that has ever been stored as a locale setting is stored in the RAM 203 as default locale information, followed by terminating the present process.

In the step S1006, the data analysis section 502 acquires the default locale information, followed by terminating the present process.

Figure 11:
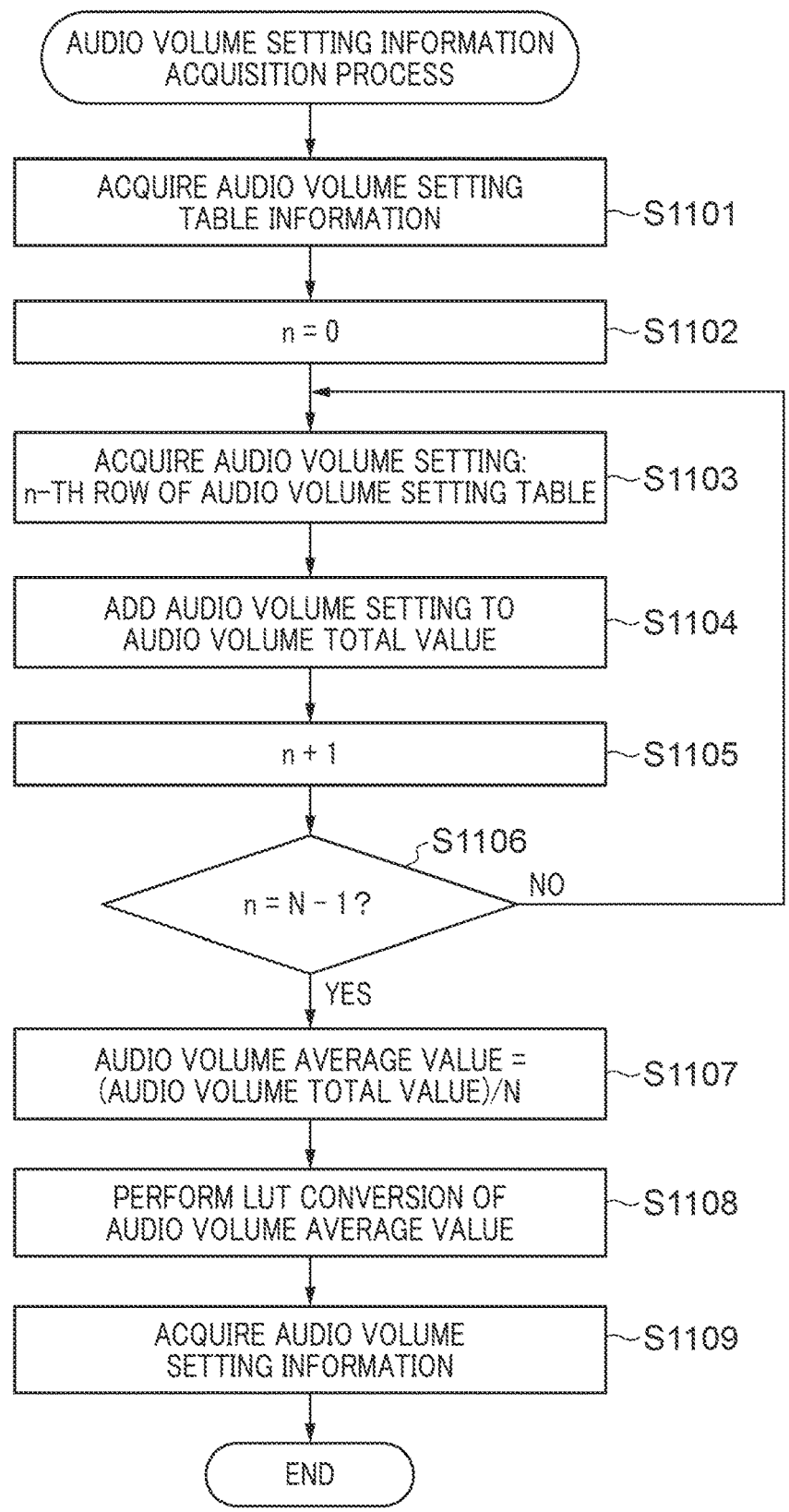
FIG. 11 is a flowchart of an audio volume setting information acquisition process performed by the MFP in a step in FIG. 9.

FIG. 11 is a flowchart of the audio volume setting information acquisition process performed by the device control program 500 of the MFP 101 in the step S906 in FIG. 9.

In a step S1101, the data analysis section 502 acquires audio volume setting information from the audio volume setting table 2104 (FIG. 21D) stored in the RAM 203.

In a step S1102, the data analysis section 502 initializes a counter in the RAM 203 to 0.

In a step S1103, the data analysis section 502 acquires record data of the n-th row of the audio volume setting table 2104.

In a step S1104 the data analysis section 502 adds an audio volume setting included in the record data of the n-th row of the audio volume setting table 2104 to an audio volume total value (initially equal to 0) prepared in advance in the RAM 203.

In a step S1105, the data analysis section 502 adds 1 to the counter n in the RAM 203.

In a step S1106, if n is N−1, the data analysis section 502 determines that the acquisition of record data of all the rows of the audio volume setting table 2104 has been completed, and the process proceeds to a step S1107. On the other hand, if n is smaller than N−1, the process returns to the step S1103 to continue the acquisition of record data. Note that N represents the number of all record data items of the audio volume setting table 2104 (7 in the present embodiment).

As described above, by repeatedly performing the operations in the steps S1103 to S1106, the data analysis section 502 adds up the values of audio volume settings in all the record data items to calculate the audio volume total value.

In the step S1107, the data analysis section 502 divides the audio volume total value calculated as above by N to calculate an audio volume average value.

In a step S1108, the data analysis section 502 performs LUT (Look Up Table) conversion by using the audio volume average value calculated in the step S1107 as an input value of the audio volume setting lookup table 2105 to obtain an output value thereof.

In a step S1109, the data analysis section 502 acquires the output value acquired in the step S1108, as audio volume setting information, followed by terminating the present process.

According to the process in FIG. 11, an average value of audio volumes of notification sound, warning sound, and so forth included in the audio volume setting table 2104 stored in the MFP 101 is calculated, and an audio volume required by the smart speaker 102 is estimated and set from the average value. With this, it is possible to properly set the audio volume of the smart speaker 102.

Figure 12:
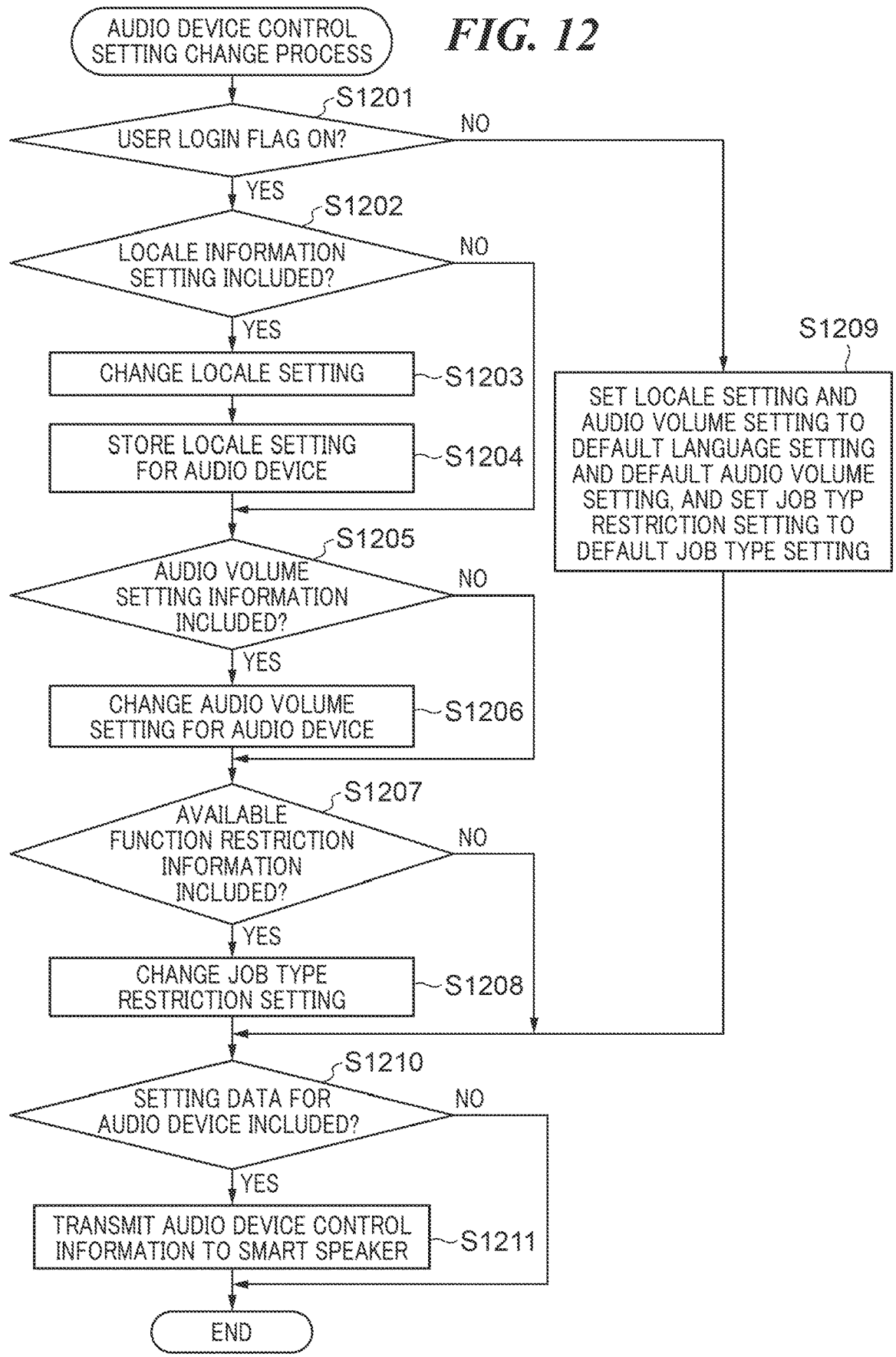
FIG. 12 is a flowchart of an audio device control setting change process performed by the cloud server in a step in FIG. 8.

FIG. 12 is a flowchart of an audio device control setting change process performed by the voice data conversion control program 700 of the cloud server 103 in the step S804 in FIG. 8.

The present process is started by the CPU 402 when the data transmission and reception section 701 receives, via the network interface 406, the audio control information transmitted by the data transmission and reception section 501 in the step S907.

In a step S1201, the voice recognition section 705 checks whether or not a user login flag of the audio control information received by the data transmission and reception section 701 is ON or OFF. As a result of the check, if the user login flag is ON (YES to the step S1201), the process proceeds to a step S1202, whereas if the user login flag is OFF (NO to the step S1201), the process proceeds to a step S1209.

In the step S1202, the voice recognition section 705 determines whether or not the audio control information received by the data transmission and reception section 701 includes locale information. If it is determined that the audio control information includes locale information (YES to the step S1202), the process proceeds to a step S1203, whereas if not (NO to the step S1202), the process proceeds to a step S1205.

In the step S1203, the voice recognition section 705 changes the locale setting stored in the RAM 403 based on the locale information included in the audio control information. At this time, the locale setting before the change is stored in the RAM 403 as a default language setting.

In a step S1204, the data management section 702 stores the locale setting changed in the step S1203, in the RAM 403 as data to be transmitted to the smart speaker 102.

In the step S1205, the voice recognition section 705 determines whether or not the audio control information received by the data transmission and reception section 701 includes the audio volume setting information. If it is determined that the audio control information includes the audio volume setting information (YES to the step S1205), the process proceeds to a step S1206, whereas if not (NO to the step S1205), the process proceeds to a step S1207.

In the step S1206, the data management section 702 changes a audio volume setting stored in the RAM 403 as data to be transmitted to the smart speaker 102, based on the audio volume setting information included in the audio control information. At this time, the audio volume setting before the change is stored in the RAM 403 as a default audio volume setting.

In the step S1207, the voice recognition section 705 determines whether or not the user information of the audio control information received by the data transmission and reception section 701 includes the available function restriction information. If it is determined that the user information includes the available function restriction information (YES to the step S1207), the process proceeds to a step S1208, whereas if not (NO to the step S1207), the process proceeds to a step S1210.

In the step S1208, the data management section 702 changes a job types restriction setting stored in the RAM 403 based on the available function restriction information included in the audio control information. At this time, the job types restriction setting before the change is stored in the RAM 403 as a default job types restriction setting. Then, the process proceeds to the step S1210.

In the step S1209, the default language setting and the default audio volume setting is acquired front the RAM 403. Then, based on the acquired default language setting and default audio volume setting, the locale setting and the audio volume setting stored in the RAM 403 as data to be transmitted to the smart speaker 102 are changed, and the process proceeds to the step S1210. Further, the job types restriction setting stored in the RAM 403 is changed to the default job types restriction setting stored in the RAM 403.

In the step S1210, the voice recognition section 705 determines whether or not the data to be transmitted to the smart speaker 102 exists in the RAM 403. If it is determined that the data to be transmitted to the smart speaker 102 exists in the RAM 403 (YES to the step S1210), the process proceeds to a step S1211, whereas if not (NO to the step S1210), the present process is immediately terminated.

In the step S1211, the data transmission and reception section 701 transmits the data stored in the RAM 403 as the data to be transmitted to the smart speaker 102, as audio device control information, from the network interface 406, followed by terminating the present process. Although the JSON data format, shown in FIG. 23, is given as an example of a data, format for the transmission at this time, this is not limitative. For example, another data format, such as XML, may be used.

Figure 13:
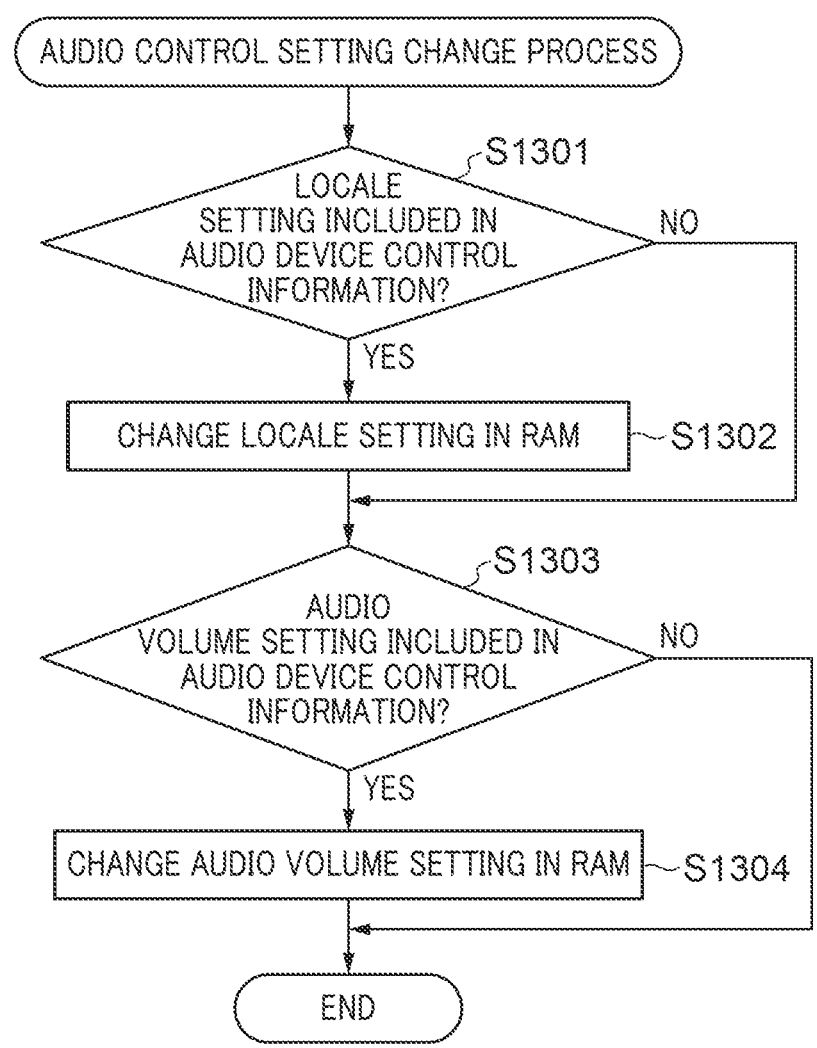
FIG. 13 is a flowchart of an audio control setting change process performed by the smart speaker in a step in FIG. 8.

FIG. 13 is a flowchart of an audio control setting change process performed by the audio device control program 600 of the smart speaker 102 in the step S806 in FIG. 8.

The present process is started by the CPU 302 when the data transmission and reception section 601 receives, via the network interface 306, the audio device control information transmitted by the data transmission and reception section 701 in the step S1211.

In a step S1301, the audio control section 603 determines whether or not the audio device control information received by the data transmission and reception section 601 includes a locale setting. If it is determined that the audio device control information includes a locale setting (YES to the step S1301), the process proceeds to a step S1302, whereas if not (NO to the step S1301), the process proceeds to a step S1303.

In the step S1302, the audio control section 603 changes the locale setting stored in the RAM 303 to the locale setting of the audio device control information.

In the step S1303, the audio control section 603 determines whether or not the audio device control information received by the data transmission and reception section 601 includes an audio volume setting. If it is determined that the audio device control information includes an audio volume setting (YES to the step S1303), the process proceeds to a step S1304, whereas if not (NO to the step S1303), the present process is immediately terminated.

In the step S1304, the audio control section 603 changes the audio volume setting stored in the RAM 303 to the audio volume setting of the audio device control information, followed by terminating the present process.

Figure 19:
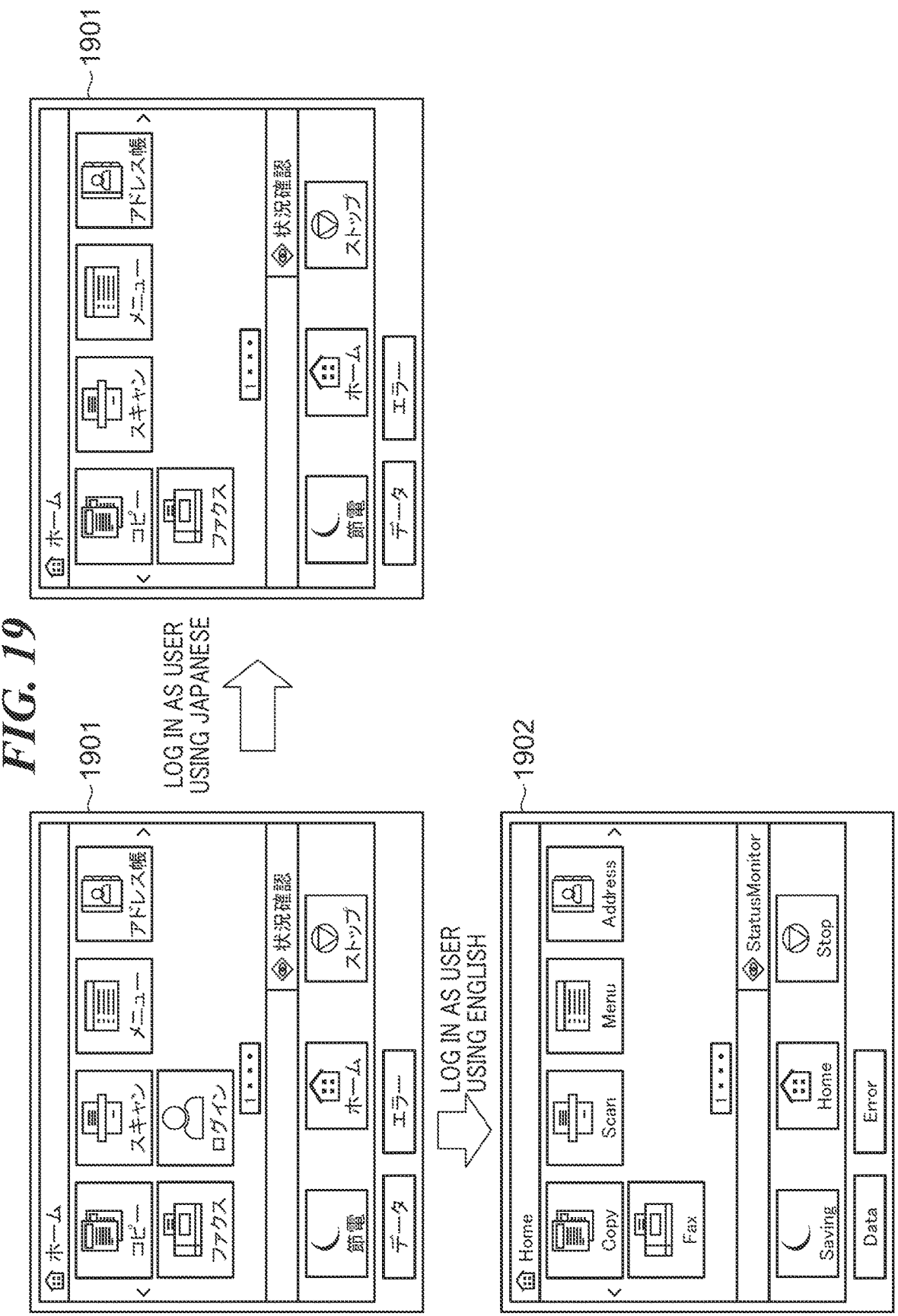
FIG. 19 is a diagram showing switching of home screen display on an operation panel, which is executed in a step in FIG. 9 in a case where user authentication is successful in the MFP.

FIG. 19 is a diagram showing a change in the display of the home screen of the operation panel 209 in the step S910 in FIG. 9, which is executed in a case where user authentication is successful in the MFP 101.

Here, a description will be given of a case where the user moves the smart card to the vicinity of the card reader 214 in a state in which a home screen 1901 having Japanese set as a default language is displayed on the operation panel 209, and as a result, user authentication of the user by the MFP 101 is successful.

In the case where the used language information included in the user information acquired from the smart card is "En", in the step S909, the display language setting information in the MFP 101 is changed to English. In this case, in the step S910, the display section 505 controls the display controller 207 to change the home screen 1901 displayed on the operation panel 209 to a home screen 1902 on which the display language is English.

On the other hand, in a case where the used language information included in the user information acquired from the smart card is "Jp", in the step S909, the display language setting information in the MFP 101 remains unchanged as Japanese. In this case, in the step S910, the display section 505 controls the display controller 207 to maintain the home screen 1901 displayed on the operation panel 209 as the home screen 1901 on which the display language is Japanese.

As described hereinabove, in the present embodiment, by using the setting of a language used by the logged-in user, it is possible for the smart speaker 102 to determine a wake word, and for the cloud server 103 to perform voice recognition, which contributes to improvement of usability.

Hereafter, a second embodiment of the present invention will be described. In the present embodiment, determination of job types usable by each logged-in user, winch has been conventionally performed by the MFP 101, is performed by the cloud server 103.

Figure 14:
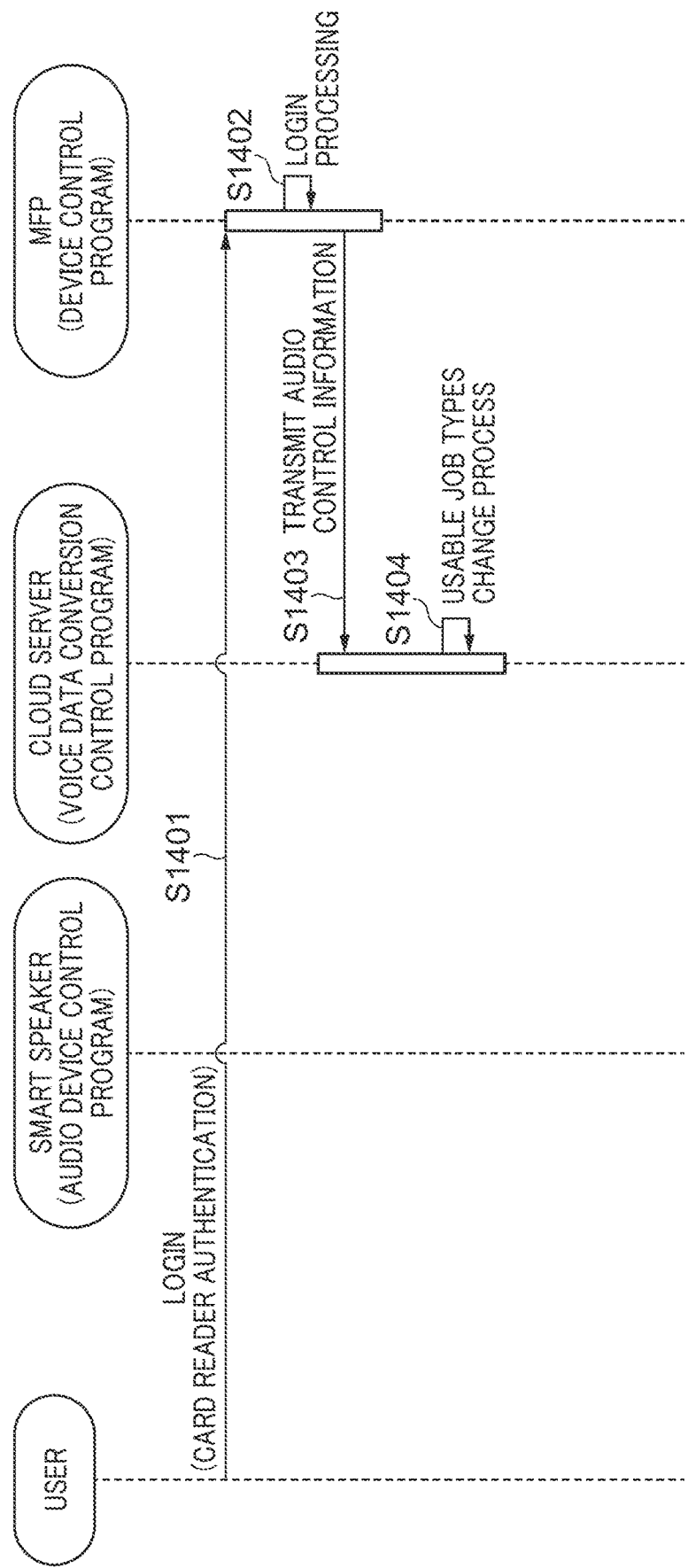
FIG. 14 is a diagram of a control sequence according to a second embodiment, which is executed by the information processing system when the user logs into the MFP.

FIG. 14 is a diagram of a control sequence according to the present embodiment, which is executed by the information processing system 100 when the user logs in.

The present process is executed by exchanging data between the MFP 101, the smart speaker 102, and the cloud server 103, which form the information processing system 100. More specifically, during an authentication operation performed when the user lop into the MFP 101, the MFP 101 notifies the cloud server 103 of setting information stored in the MFP 101, whereby settings in the cloud server 103 are changed according to the setting information.

In the example of the sequence shown in FIG. 14, the MFP 101 and the cloud server 103 are in a state capable of communicating with each other. Further, the MFP 101 is in a state completed in initialization and displaying a home screen according to the default language setting, from which various functions, such as a copy function, a scan function, and a print function, can be called, after the startup of the MFP 101 by power on. Here, in the present embodiment, it is assumed that the default language is set to Japanese.

Similar to the first embodiment, the operations executed by the MFP 101 are in actuality performed by the CPU 202 that executes the device control program 500 described hereinabove with reference to FIG. 5. Further, the operations executed by the smart speaker 102 are in actuality performed by the CPU 302 that executes the audio device control program 600 described hereinabove with reference to FIG. 6. Similarly, the operations executed by the cloud server 103 are in actuality performed by the CPU 402 that executes the voice data conversion control program 700 described hereinabove with reference to FIG. 7.

First, in a step S1401, the MFP 101 receives a login operation by the user. Although in the present embodiment, the login operation refers to a user operation of moving a smart card to the vicinity of the card reader 214 this is not limitative. For example, a user operation of inputting the user name, password or personal identification number (PIN) of the user, or other information associated with the user to the operation panel 209 may be the login operation.

In a step S1402, first, the MFP 101 performs login processing according to the login operation received in the step S1401. As a result, when authentication of the user is successful, next, the MFP 101 acquires audio control information. Here, the audio control information is information stored in the storage 205, which includes user information of the successfully authenticated user, and information to be notified to the cloud server 103 and the smart speaker 10 out of the MFP configuration information. Further, in a case where a language used by the user is included in the acquired user information, the MFP 101 changes the display language on the panel 209 to the language used by the user.

In a step S1403, the MFP 101 transmits the audio control information acquired in the step S1402 to the cloud server 103 via the network interface 406. Details of a process in the steps S1401 to S1403 will be described hereinafter with reference to FIG. 16.

In a step S1404, upon receipt of the audio control information transmitted in the step S803 by the data transmission and reception section 701, the cloud server 103 changes job types usable by the user who perform voice operation of the smart speaker 102, according to the audio control information. Details of the processing in the step S1404 will be described hereinafter with reference to a flowchart shown in FIG. 17.

Although not shown in FIG. 14, in the present embodiment as well by performing the same processing as in FIG. 12, audio device control information is generated according to the audio control information and is transmitted to the smart speaker 102.

Figure 15:
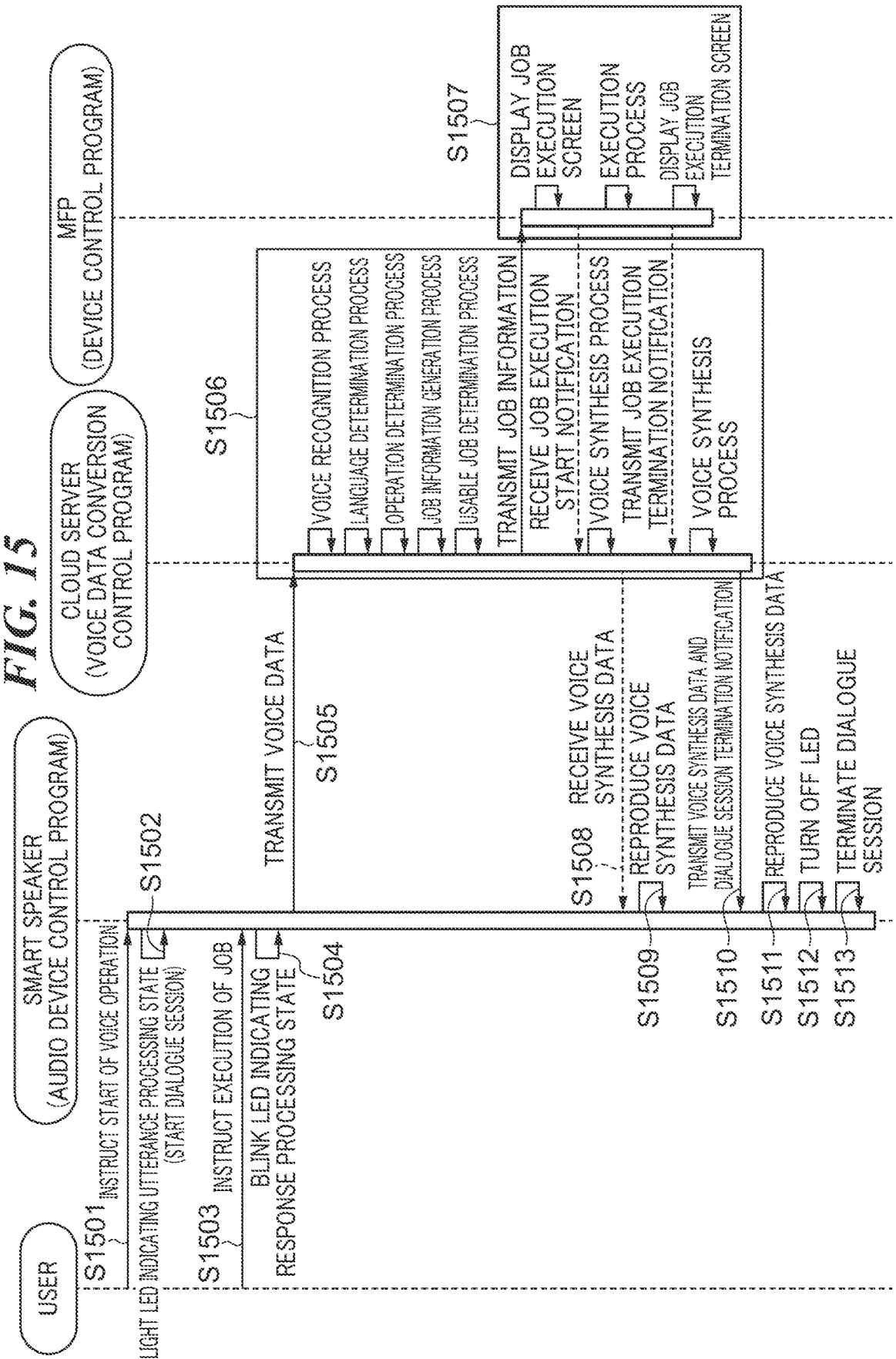
FIG. 15 is a diagram of a control sequence according to the second embodiment, which is executed by the information processing system during execution of a job.

FIG. 15 is a diagram of a control sequence according to the present embodiment, which is executed by the information processing system 100 during, execution of a job.

The present process is executed by exchanging data between the MFP 101, the smart speaker 102, and the cloud server 103, which form the information processing system 100. More specifically, in the present control sequence, when the smart speaker 102 receives a voice operation from the user, the MFP 101 executes processing operations according to the voice operation, whereafter the smart speaker 102 returns a voice response indicative of a result of execution of the processing operations to the user.

Note that in the example of the sequence shown in FIG. 15, the control sequence in FIG. 14 executed during the user login has been completed, and the smart speaker 102, the MFP 101 and the cloud server 103 are in a state capable of communicating with each other. Furthermore, the MFP 101 is in a state displaying the home screen 1901 in the language used by the logged-in user. Further, the voice operation start detection section 607 of the smart speaker 102 is in a state continually listening for an analog voice acquired by the microphone 308 from the user in the vicinity of the smart speaker 102 so as to detect a wake word from the analog voice.

First, in a step S1501, the smart speaker 102 detects a voice operation start instruction operation by the user, using the voice operation start detection section 607. Although in the present embodiment, the voice operation start instruction operation refers to a user operation of uttering the wake word to the smart speaker 102, this is not limitative. For example, a user operation of pressing the operation start key of the smart speaker 102 may be the voice operation start instruction operation.

In a step S1502, the smart speaker 102 causes the display section 606 to light the LED 312 so as to indicate that the smart speaker 102 has entered the utterance processing state, and at the same time, causes the voice acquisition section 604 to start the processing operation, to thereby start a dialogue session with the user.

In a step S1503, the smart speaker 102 detects a user operation instructing the execution of a job by the voice acquisition section 604 (detection unit). Here, the operation instructing the execution of a job refers to an operation giving an utterance, e.g. "Four Copies" or a Japanese phrase having the same meaning in order that the user causes the information processing system 100 to perform the job during the utterance processing state. When the voice acquisition section 604 (conversion unit) acquires an analog voice instructing the execution of the job, the voice acquisition section 604 converts the analog voice to voice data and temporarily stores the voice data in the RAM 303. Then, in a case where the blank time has reached a predetermined time period so that the utterance termination determination section 608 determines that the utterance of the user has been terminated, the process proceeds to a step S1504.

In the step S1504, the smart speaker 102 causes the display section 606 to blink the LED 312 so as to indicate that the smart speaker 102 has entered the response processing state and at the same time causes the voice acquisition section 604 to terminate its processing operation.

In a step S1505, the smart speaker 102 transmits the voice data temporarily stored in the RAM 303 in the step S1503, to the cloud server 103 using the data transmission and reception section 601.

In a step S1506, the cloud server 103 starts a job execution process based on the voice data received by the data transmission and reception section 701.

The job execution process is comprised of the voice recognition process and a language determination process, and a job input process executed thereafter.

The voice recognition process is a process in which the voice recognition section 705 generates, based on the voice data received by the data transmission and reception section 701, a plurality of voice recognition data items each formed by text data and a language format thereof, using the above-described second voice recognition method, and outputs the same.

The language determination process is a process in which the morpheme analysis section 706 (identification unit) analyzes the morphemes of text data included in each voice recognition data item output by the voice recognition process based on the language setting of the text data. With this, there are identified the job type and keywords of the job which the user has instructed to execute by the job execution instruction operation in the step S1503.

In the job input process, an operation determination process, a job information generation process, a usable job determination process, and transmission of job information to the MFP 101 are performed. Furthermore, then, in the job input process, a job execution start notification and a job execution termination notification are received from the MFP 101, and a voice synthesis process responsive to the job execution start notification and a voice synthesis process responsive to the job execution termination notification are performed. Voice synthesis data items generated by the voice synthesis processes are transmitted to the smart speaker 102. Details of the job input process will be described hereinafter using a flowchart in FIG. 18.

In a step S1507, the MFP 101 performs, in the job execution process started in the step S1506, a process according to job information with the language setting, which has been transmitted from the cloud server 103.

In a step S1508, the smart speaker 102 receives the voice synthesis data transmitted from the cloud server 103 in the job execution process started in the step S1506, by the data transmission and reception section 601.

In a step S1509, the smart speaker 102 reproduces the voice synthesis data (e.g. voice synthesis data of "Copy is started" received in the step S1508, by the voice reproduction section 605 via the speaker 310.

In a step S1510, the smart speaker 102 receives the voice synthesis data and a dialogue session termination notification transmitted from the cloud server 103 in the job execution process started in the step S1506, by the data transmission and reception section 601. Here the dialogue session termination notification is a notification by which the cloud server 103 instructs the smart speaker 102 to terminate the dialogue session with the user.

In a step S1511, the smart speaker 102 reproduces the voice synthesis data e.g. voice synthesis data of "Copy has been terminated") received in the step S1510, via the speaker 310, by the voice reproduction section 605.

In a step S1512, the smart speaker 102 causes the display section 606 to turn off the LED 312 so as to indicate that the smart speaker 102 terminates the response processing state and enters the standby state.

In a step S1513, the smart speaker 102 shifts to the standby state and terminates the dialogue session with the user.

Note that even if in the sequence shown in FIG. 15, the smart speaker 102 is in the response processing state (i.e. LED 312 is blinking), the voice operation start detection section 607 detects a wake word. With this, by uttering "Cancel" or "Stop" as a function calling instruction operation subsequent to the utterance of the wake word, to the smart speaker 102 in the response processing state, the user can forcibly terminate the dialogue session.

Figure 16:
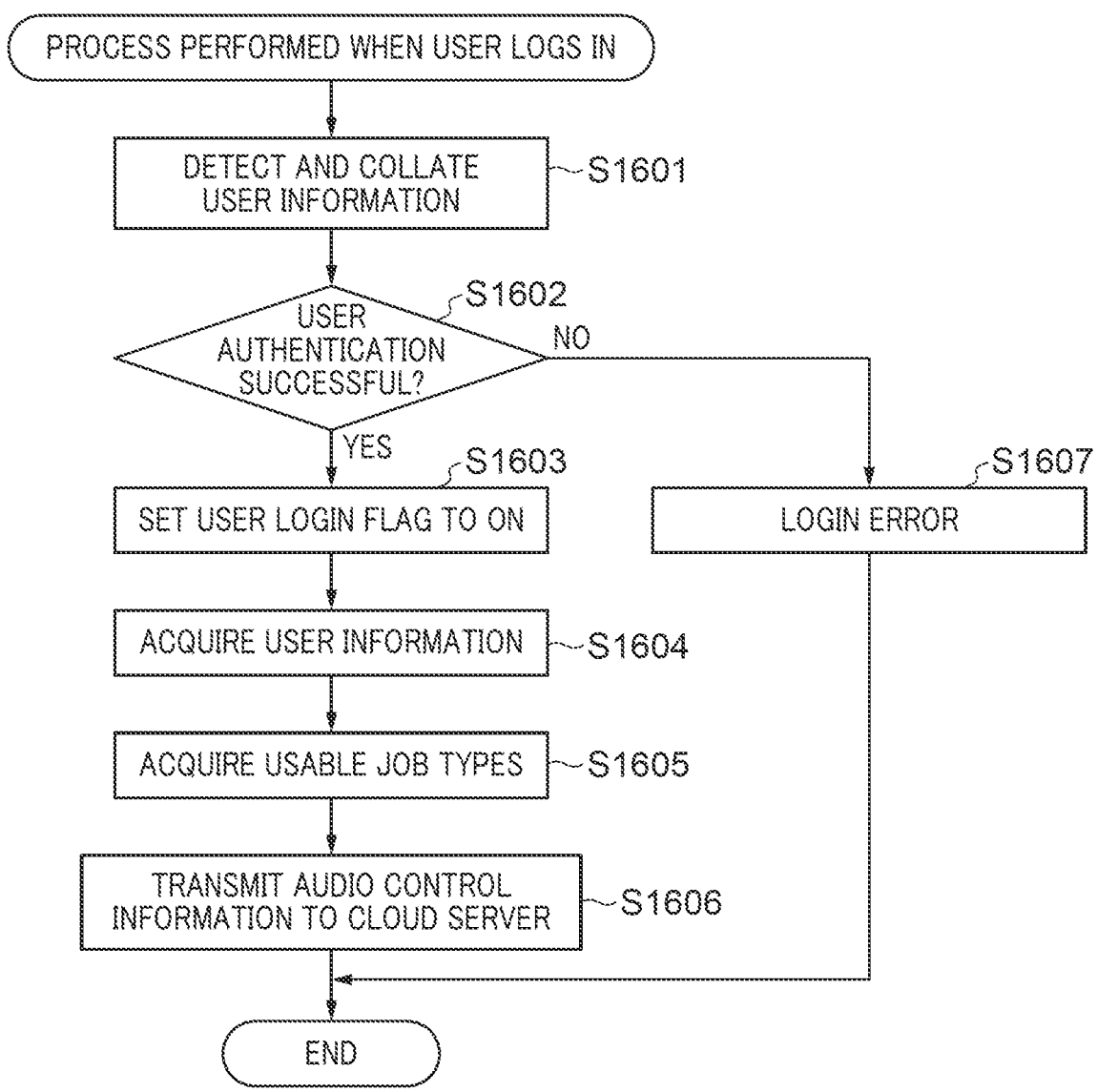
FIG. 16 is a flowchart of a process performed by the MFP in steps in FIG. 14 when the user logs into the MFP.

FIG. 16 is a flowchart of the process performed when the user logs into the MFP 101, which is executed by the device control program 500 of the MFP 101, in the steps S1401 to S1403 in FIG. 14. As described hereinafter, steps S1601 and S1606 correspond to the steps S1401 and S1403, respectively, and steps in FIG. 16, other than the S1601 and S1606 correspond to the step S1402.

In the step S1601, the processing in the step S1401 is executed. That is, when the smart card held by the user enters a communicable area of the card reader 214 the operation object determination section 506 detects the smart card by the card reader 214 and acquires user information. Next, the operation object determination section 506 collates the acquired user information with the logged-in user information table 2001 stored by the data management section 504.

As a result of the collation in the step S1601, if there is information that matches the acquired user information, in a step S1602, the data analysis section 502 determines that the authentication of the user is successful, and the process proceeds to a step S1603, whereas if not, the data analysis section 502 determines that the authentication of the user is not successful, and the process proceeds to a step S1607.

In the step S1603, the data management section 504 sets the user login flaw to ON which indicates that the user is in a logged-in state, and stores the changed user login flag in the RAM 203.

In a step S1604, the data management section 504 acquires the user information from the logged-in user information table 2001. For example, in a case where the logged-in user is a user whose identification ID is 1, the data management section 504 acquires record information including the identification ID of 1, as the user information, from the logged-in user information table 2001, and stores the record information in the RAM 203.

In a step S1605, the data analysis section 502 acquires job types usable by the logged-in user from the user information acquired by the data management section 504 in the step S1604. For example, in a case where the logged-in user is the user whose identification ID is 1, appearing in the logged-in user information table 2001 (FIG. 20), the data analysis section 502 acquires SEND/PRINT/SCAN/FAX as information on usable job types corresponding to the available function restriction information of the logged-in user, and stores the same in the RAM 203. Further, the data analysis section 502 acquires locale information and audio volume setting information and stores the same in the RAM 203.

In the step S1606, the processing in the step S1403 is executed. That is, the data transmission and reception section 501 transmits, to the cloud server 103, the audio control information including the user login flag and the job types usable by the logged-in user which are stored in the RAM 203 in the steps S1603 and S1605, respectively, the locale information, and the audio volume setting information, followed by terminating the present process.

In the step S1607, the display section 505 controls the display controller 207 to display the login error occurrence screen on the operation panel 209, followed by terminating the present process.

Figure 17:
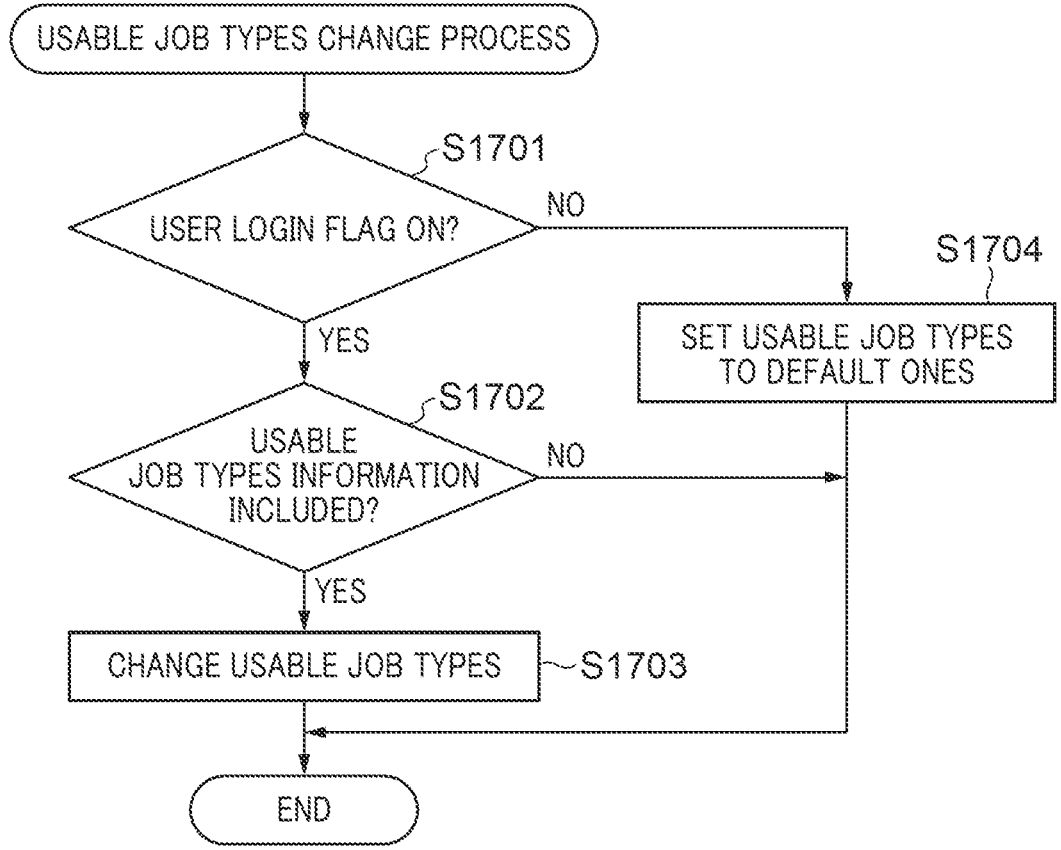
FIG. 17 is a flowchart of a usable job types change process performed by the cloud server in a step in FIG. 14.

FIG. 17 is a flowchart of a usable job types change process performed by the voice data conversion control program 700 of the cloud server 103 in the step S1404 in FIG. 14.

The present process is started by the CPU 402 when the data transmission and reception section 701 receives, via the network interface 406, the audio control information transmitted by the data transmission and reception section 501 in the step S1606.

In a step S1701, the voice recognition section 705 checks whether or not the user login flag of the audio control information received by the data transmission and reception section 701 is ON. As a result of the check, if the user login flag is ON (YES to the step S1701), the process proceeds to a step S1702, whereas if the user login flag is OFF (NO to the step S1701), the process proceeds to a step S1704.

In the step S1702, the voice recognition section 705 determines whether or not the audio control information received by the data transmission and reception section 701 includes information on the job types usable by the logged-in user. If it is determined that the audio control information includes the information on the usable job gees (YES to the step S1702), the process proceeds to a step S1703, whereas if not (NO to the step S1702), the present process is immediately terminated.

In the step S1703, the data management section 702 changes the setting of the usable job types stored in the RAM 403 based on the information on the job types usable by the logged-in user included in the audio control information. At this time, the setting of the usable job types before the change is stored in the RAM 403 as a default usable job types setting, followed by terminating the present process.

In the step S1704, the setting of the usable job types stored in the RAM 403 is changed to the default usable job types setting stored in the RAM 403, followed by terminating the present process.

Figure 18:
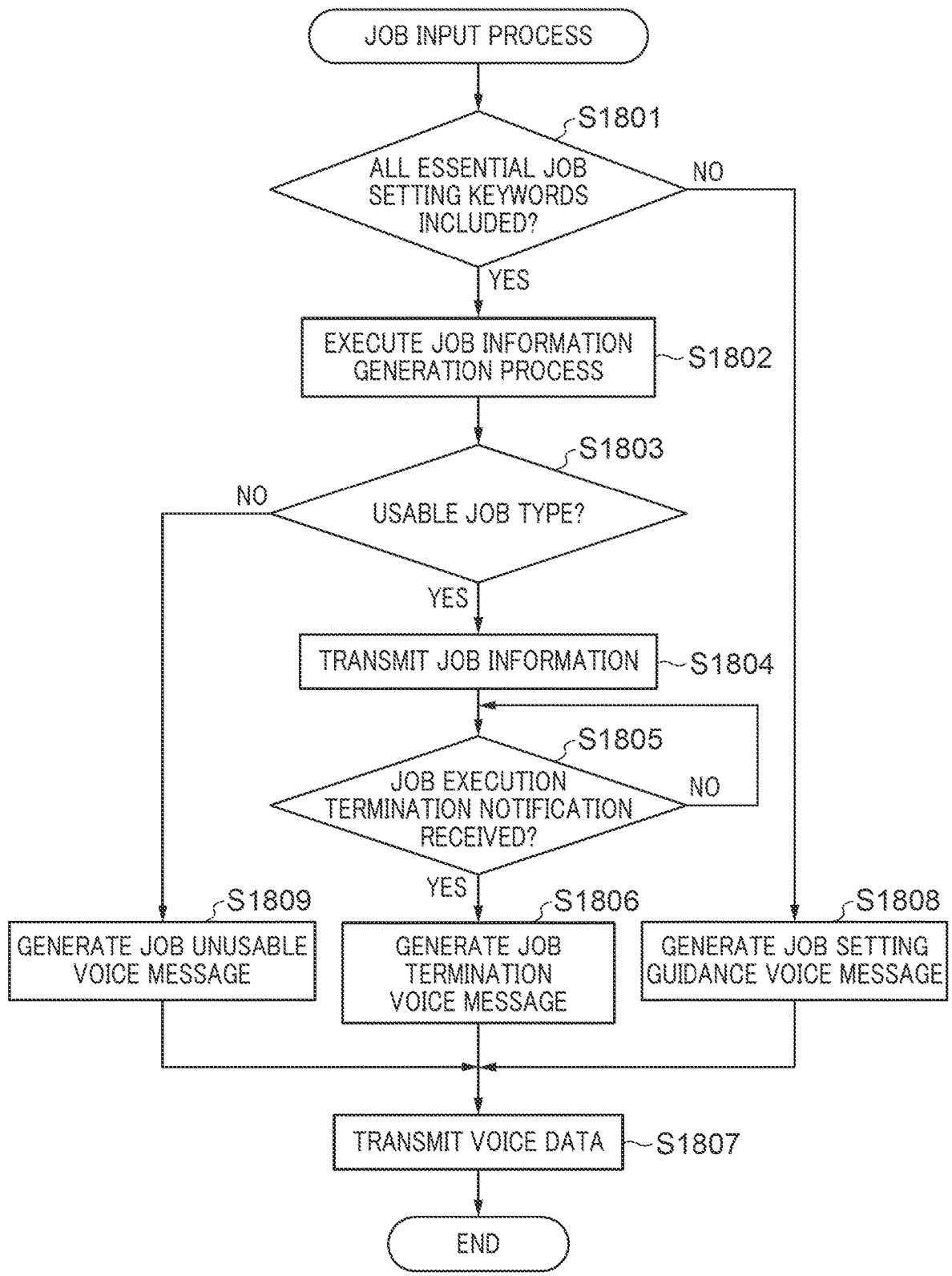
FIG. 18 is a flowchart of a job input process, which is part of a job execution process performed by the cloud server in a step in FIG. 15.

FIG. 18 is a flowchart of the job input process, which is part of the job execution process performed by the voice data conversion control program 700 of the cloud server 103 in the step S1506 in FIG. 15.

The present process is executed after the cloud server 103 receives, from the smart speaker 102, the voice data of the job execution instruction operation from the user in the step S1505, converts the voice data to text data by the voice recognition process, and analyzes the morphemes of the text data by the language determination process.

First, in a step S1801, the CPU 402 performs the operation determination process. Specifically the CPU 402 determines whether or not all essential job setting keywords of the group ID list stored in the RAM 403 are included in a result of the morpheme analysis of the text data in the language determination process. Each essential job setting keyword is indicative of a setting which the user is necessarily required to set when the user performs the job execution instruction operation in the step S1503. For example, in a case where "EMAILSEND" is included as a job type in the result of the morpheme analysis, a keyword (e.g. "CNF0004") meaning an address is required to be included in the result of the morpheme analysis as an essential job setting keyword. Note that the essential job setting keywords are different depending on the job type. There may be a job type without any essential job setting keyword, and there ma be a job type with a plurality of essential job sitting keywords.

If it is determined in the step S1801 that all essential job setting keywords of the group ID list are included in the result of the morpheme analysis of the text data, the process proceeds to a step S1802, wherein the CPU 402 (generation unit) performs the job information generation process based on the result of the morpheme analysis. By performing this process, job information with a language setting, which is device operation data for the MFP 101 to execute the job, is generated.

In a step S1803, the CPU 402 performs the usable job determination process. Specifically, in a case where a job type included in the result of the morpheme analysis is included in the setting of the usable job types stored in the RAM 403, the process proceeds to a step S1804, whereas if not, the process proceeds to a step S1809.

In the step S1804, the data transmission and reception section 701 (transmission unit) transmits the job information with the language setting generated in the step S1802 to the MFP 101 via the network interface 406. Upon receipt of this job information with the language setting, the MFP 101 starts the processing in the step S1507 in FIG. 15.

In a step S1805 following the step S1804, the data transmission and reception section 701 waits for receipt of the job execution termination notification from the MFP 101 via the network interface 406, and when the job termination notification is received, the process proceeds to a step S1806. Although not shown in FIG. 18, in a case where the data transmission and reception section 701 receives the job execution start notification from the MFP 101, the CPU 402 may generate data of job start voice, which is a message corresponding to the job execution start notification, and transmit the data of the job start voice to the smart speaker 102. Examples of the job start voice include "Job has been started".

Upon receipt of the job execution termination notification in the step S1805, the CPU 402 generates a job termination voice message corresponding to the received job execution termination notification in the step S1806 and sets the job termination voice message as voice data in the RAM 403. Here, in a case where the job execution termination notification is a notification to the effect that the job has been normally terminated, a voice message "The job has been terminated" is generated as the job termination voice message. On the other hand, in a case where the job execution termination notification is a notification to the effect that a sheet jam or an error has occurred in the MFP 101, a voice message "Job terminated in error" is generated as the job termination voice message.

In a step S1807, the data transmission and reception section 701 transmits voice data set in the RAM 403 to the smart speaker 102 via the network interface 406, followed by terminating the present process. Here, the voice data set in the RAM 403 refers to the voice data set in the RAM 403 in the step S1806 or voice data set in the RAM 403 in one of steps S1808 and S1809, described hereinafter.

If it is determined in the step S1801 that not all the essential job setting keywords of the group ID list are included in the result of the morpheme analysis, the process proceeds to a step S1808. In the step S1808, the CPU 402 generates a job setting guidance voice message, which is a message for prompting input of an essential job setting keyword, and sets the job setting guidance voice message as voice data in the RAM 403. Examples of the job setting guidance voice message include a message "input the address of the transmission destination" which is given in a case where the address of a transmission destination is not designated though the user has designated "EMAILSEND".

If it is determined in the step S1803 that the job type included in the result of the morpheme analysis is not a job type usable by the logged-in user, the process proceeds to a step S1809. In the step S1809, the CPU 402 generates a job unusable voice message, which is a message notifying the user that the job is unusable, and sets the message as voice data in the RAM 403. Examples of the job unusable voice message include a message "The function is unusable" which is given, e.g. in a case where the user has designated "SEND" which is unusable by the user.

As described hereinbefore, it is possible for the cloud server 103 to determine whether or not a job type is usable, on a logged-in user-by-logged-in user basis.

Note that although in the information processing system 100 according to the present embodiment, the MFP 101 and the cloud server 103 are formed separately from each other, they may be integrally formed with each other as an information processing apparatus.

Further, although in the information processing system 100 according to the present embodiment, the cloud server 103 manages the settings of the smart speaker 102, a server not in the cloud may manage the settings of the smart speaker 102.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-106388, filed Jun. 19, 2020, which is hereby incorporated by reference herein in its entirety.

What is claimed is:

1. An information processing apparatus that cooperates with a smart speaker, comprising:
a first acquisition unit configured to acquire identification information of a user;
a second acquisition unit configured to acquire audio control information associated with the acquired identification information; and
a request unit configured to request the smart speaker to change an audio setting of the smart speaker based on the acquired audio control information.

2. The information processing apparatus according to claim 1, wherein the audio setting includes at least one of a locale setting and an audio volume setting.

3. The information processing apparatus according to claim 2, wherein the audio control information includes information on a language used by the user, which is used for changing the locale setting.

4. An information processing system, in which an information processing apparatus, a smart speaker, and a server that manages settings of the smart speaker cooperate with each other,
wherein the information processing apparatus comprises:
a first acquisition unit configured to acquire identification information of a user;
a second acquisition unit configured to acquire audio control information associated with the acquired identification information; and
a first request unit configured to request the server to change an audio setting of the smart speaker based on the acquired audio control information,
wherein the server comprises:
a second request unit configured to request the smart speaker to change the audio setting based on the request by the first request unit, and
wherein the smart speaker comprises:
a change unit configured to change the audio setting of the smart speaker based on the request by the second request unit.

5. The information processing system according to claim 4, wherein the audio control information includes information on job types usable by the user,
wherein the smart speaker further comprises:
a detection unit configured to detect an analog voice that is produced by the user making an utterance so as to cause the information processing system to execute a job, and
a conversion unit configured to convert the detected analog voice to voice data, and
wherein the server further comprises:
an identification unit configured to identify a job type of the job from the voice data,
a generation unit configured to generate job information for executing the job, for the in processing apparatus, only in a case where the identified job type is included in the information on the job types usable by the user, and
a transmission unit configured to transmit the job information to the information processing apparatus.

6. A method of controlling an information processing apparatus cooperates with a smart speaker, comprising:
acquiring identification information of a user;
acquiring audio control information associated with the acquired identification information; and
requesting the smart speaker to change an audio setting of the smart speaker based on the acquired audio control information.

7. A method of controlling an information processing system, in which an information processing apparatus, a smart speaker, and a server that manages settings of the smart speaker cooperate with each other, comprising:
causing the information processing apparatus to perform:
acquiring identification information of a user;
acquiring audio control information associated with the acquired identification information; and
requesting the server to change an audio setting of the smart speaker based on the acquired audio control information;
causing the server to perform:
requesting the smart speaker to change the audio setting based on the request to the server; and
causing the smart speaker to perform:
changing the audio setting of the smart speaker based on the request to the smart speaker.

8. A non-transitory computer-readable storage medium storing a program for causing a computer to execute a method of controlling an information processing apparatus that cooperates with a smart speaker, the method comprising:
acquiring identification information of a user;
acquiring audio control information associated with the acquired identification information; and
requesting the smart speaker to change an audio setting of the smart speaker based on the acquired audio control information.

9. A non-transitory computer-readable storage medium storing a program for causing a computer to execute a method of controlling an information processing system, in which an information processing apparatus, a smart speaker, and a server that manages settings of the smart speaker cooperate with each other, the method comprising:
causing the information processing apparatus to perform:
acquiring identification information of a user,
acquiring audio control information associated with the acquired identification information; and
requesting the server to change an audio setting of the smart speaker based on the acquired audio control information;
causing the server to perform:
requesting the smart speaker to change the audio setting based on the request to the server; and
causing the smart speaker to perform:
changing the audio setting of the smart speaker based on the request to the smart speaker.

* * * * *